(12) United States Patent
Nakane et al.

(10) Patent No.: US 10,802,226 B2
(45) Date of Patent: Oct. 13, 2020

(54) CLEANING TOOL

(71) Applicant: FUJIKURA LTD., Tokyo (JP)

(72) Inventors: Junichi Nakane, Chiba (JP); Kunihiko Fujiwara, Chiba (JP); Shigeo Takahashi, Chiba (JP); Akihiro Nakama, Chiba (JP); Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/348,183

(22) PCT Filed: Oct. 23, 2017

(86) PCT No.: PCT/JP2017/038194
§ 371 (c)(1),
(2) Date: May 8, 2019

(87) PCT Pub. No.: WO2018/088185
PCT Pub. Date: May 17, 2018

(65) Prior Publication Data
US 2019/0369337 A1 Dec. 5, 2019

(30) Foreign Application Priority Data

Nov. 9, 2016 (JP) .................................. 2016-218762
Nov. 30, 2016 (JP) .................................. 2016-232913
Nov. 30, 2016 (JP) .................................. 2016-232915

(51) Int. Cl.
*G02B 6/38* (2006.01)
*B08B 1/00* (2006.01)
*B08B 7/00* (2006.01)

(52) U.S. Cl.
CPC .............. *G02B 6/3866* (2013.01); *B08B 1/00* (2013.01); *B08B 7/0028* (2013.01);
(Continued)

(58) Field of Classification Search
CPC .. G02B 6/3807; G02B 6/3866; G02B 6/3821; G02B 6/3869; G02B 6/3879; B08B 1/00; B08B 2240/02; B08B 7/0028
(Continued)

(56) References Cited

U.S. PATENT DOCUMENTS 6,374,030 B2 * 4/2002 Krow, Jr. ............. G02B 6/3807
385/134
2002/0006261 A1 1/2002 Krow et al.
(Continued)

FOREIGN PATENT DOCUMENTS

JP H3-105803 U 11/1991
JP 2000-206369 A 7/2000
(Continued)

OTHER PUBLICATIONS

Notice of Reasons for Refusal issued in corresponding Japanese Patent Application No. 2018-550111 dated Sep. 30, 2019, with translation (10 pages).

*Primary Examiner* — Michael P Mooney
(74) *Attorney, Agent, or Firm* — Osha Liang LLP

(57) ABSTRACT

A cleaning tool for cleaning a plurality of optical connectors where the cleaning tool includes: an adhesive portion that is integrally formed with the cleaning tool and that contacts a plurality of connecting end faces of the optical connectors collectively. The plurality of optical connectors are inserted into and connected with one housing that is fitted with another housing. The adhesive portion is disposed on the other housing. The adhesive portion contacts the connecting end faces collectively by fitting the one housing with the other housing.

18 Claims, 19 Drawing Sheets

(52) U.S. Cl.
CPC ......... *G02B 6/3821* (2013.01); *G02B 6/3869* (2013.01); *B08B 2240/02* (2013.01)

(58) Field of Classification Search
USPC .................................................. 385/134–139
See application file for complete search history.

(56) References Cited

U.S. PATENT DOCUMENTS

| | | | |
|---|---|---|---|
| 2003/0169992 A1* | 9/2003 | Fujiwara | ................... B08B 1/00 385/134 |
| 2005/0013577 A1* | 1/2005 | Koide | .................. G02B 6/3807 385/134 |
| 2005/0286853 A1 | 12/2005 | Fujiwara et al. | |
| 2014/0219619 A1 | 8/2014 | Hui et al. | |

FOREIGN PATENT DOCUMENTS

| | | | |
|---|---|---|---|
| JP | 2002219421 A | 8/2002 | |
| JP | 2004-4593 A | 1/2004 | |
| JP | 2006-221031 A | 8/2006 | |
| JP | 2008180799 A | 8/2008 | |
| JP | 2013201404 A | 10/2013 | |
| WO | 2015/017170 A1 | 2/2015 | |

* cited by examiner

CLEANING TOOL

BACKGROUND

The present invention relates to a cleaning tool for an optical connector.

Dust or the like adhering to an endface of an optical connector causes an increase in loss of optical signals and the like. To avoid this, cleaning of the endface of the optical connector is needed. Patent Literature 1 describes a cleaning tool including a cleaning pad, the cleaning tool being able to be inserted into and attached to a housing of an optical connector. Moreover, Patent Literature 2 describes a backplane connector that connects a plurality of optical connectors collectively, and that cleaning tools are respectively inserted into and connected to a plurality of optical connector holes formed in one housing to thereby clean connecting end faces of the plurality of optical connectors at once.

PATENT LITERATURE

[PTL 1] U.S. Pat. No. 6,374,030
[PTL 2] Japanese Patent Application Publication No. 2002-219421

In some cases, a multiple optical connector, such as a backplane connector connecting a plurality of optical connectors collectively, cleaning-target optical connectors are mounted densely. In a case of replacing cleaning tools attached to the plurality of optical connector holes as described in Patent Literature 2, the cleaning tools need to be replaced individually, which makes the replacement complicated. In addition, in a case of a densely-mounted multiple optical connector, cleaning tools are provided so as to correspond to alignment of a plurality of optical connectors. Individual replacement of such cleaning tools needs a precise operation, so that the entire replacement operation results in poor workability.

SUMMARY

One or more embodiments of the present invention may provide a cleaning tool including an adhesive portion for cleaning that comes in contact with connecting end faces of a plurality of optical connectors collectively and is easily replaceable.

Some embodiments of the present invention provide a cleaning tool for cleaning an optical connector, the cleaning tool including an adhesive portion that is integrally formed to come into contact with a plurality of connecting end faces of the optical connector collectively.

Other features of the invention are made clear by the following description and the drawings.

According to some embodiments of the present invention, the adhesive portion for cleaning that is to come into contact with the connecting end faces of the plurality of optical connectors collectively can be replaced easily.

DETAILED DESCRIPTION

Figure 1:
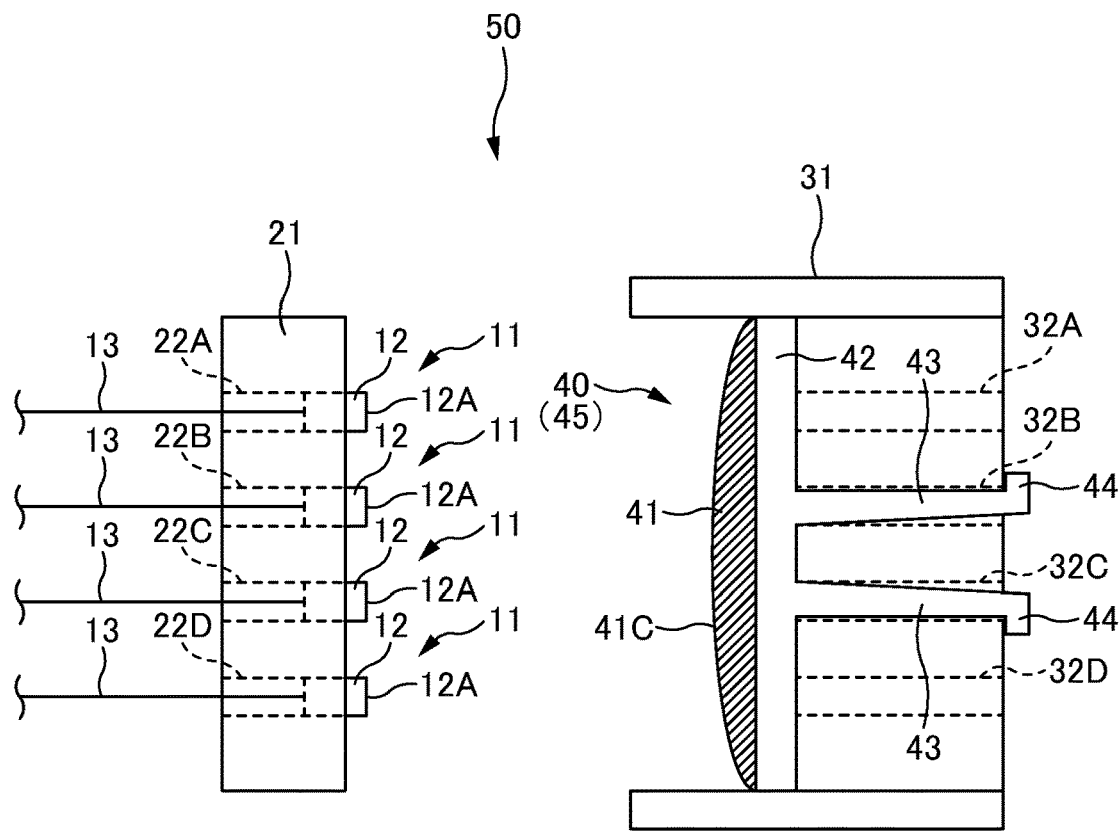
FIG. 1 is an explanatory diagram illustrating a cleaning tool 40 according to one or more embodiments.

At least the following matters are made clear from the following description and the drawings.

(1) Disclosed is a cleaning tool for cleaning an optical connector, the cleaning tool comprising: an adhesive portion that is integrally formed to come into contact with a plurality of connecting end faces of the optical connector collectively. According to such a cleaning tool, the adhesive portion for cleaning that is to come in contact with a plurality of the connecting end faces of the optical connector collectively can be replaced easily.

In one or more embodiments, the optical connector further includes one housing which a plurality of the optical connectors are to be inserted into and connected with and another housing to be fitted with the one housing, the adhesive portion is to be provided to the other housing, and the adhesive portion comes into contact with the connecting end faces collectively by fitting the one housing and the other housing with each other. Accordingly, the adhesive portion for cleaning that is to come in contact with the connecting end faces of the plurality of optical connectors collectively can be replaced easily.

In one or more embodiments, the adhesive portion is provided to an attachment that is detachably attachable to the other housing. Accordingly, the adhesive portion for cleaning that is to come in contact with the connecting end faces of the plurality of optical connectors collectively can be replaced easily.

In one or more embodiments, an engaging portion is formed at an end portion of the attachment on an opposite side to the adhesive portion, the engaging portion being configured to engage the attachment at the other housing. Accordingly, the attachment can be detached from the housing only by releasing the engagement using the engaging portion.

In one or more embodiments, an engagement release piece is formed at an end portion of the attachment on a same side as the adhesive portion, and the engagement release piece is able to release engagement of the attachment with the other housing using the engaging portion. Accordingly, the adhesive portion for cleaning that is to come in contact with the connecting end faces of the plurality of optical connectors can be replaced easily.

In one or more embodiments, a pair of ferrule pins is formed in each of the connecting end faces, and a thickness of the adhesive portion is greater than a length of the ferrule pins. Accordingly, even if the adhesive portion comes into contact with the connecting end faces, the ferrule pins can be suppressed from hitting on the attachment and being damaged.

In one or more embodiments, when the pair of ferrule pins comes into contact with the adhesive portion, a portion between the pair of ferrule pins in the adhesive portion rises. Accordingly, the area of the adhesive portion that comes into contact with the cleaning-target connecting end face can be increased.

In one or more embodiments, the adhesive portion is formed to be detachably attachable to the other housing. Accordingly, the adhesive portion for cleaning that is to come in contact with the connecting end faces of the plurality of optical connectors collectively can be replaced easily.

In one or more embodiments, a frame part is formed around a portion in which the adhesive body is formed. Accordingly, the adhesive portion for cleaning that is to come in contact with the connecting end faces of the plurality of optical connectors collectively can be attached and detached easily.

(2) For optical connectors, the connecting end faces of both the optical connectors to be connected with each other are cleaning targets. However, in the case of a cleaning tool as described in Patent Literature 2, the cleaning tool needs to be inserted into and connected with a printed-board housing (or a backplane housing) in place of optical connectors. In this case, it is not possible to clean the connecting end face of a backplane-housing-side (or printed-board-housing-side) optical connector while an optical connector is inserted into and connected with the printed-board housing (or the backplane housing). In other words, it is necessary, for each optical connector, that the optical connector is removed from the housing of the optical connector opposing a cleaning-target optical connector before cleaning operation, and the optical connector is inserted and connected again after the cleaning operation. Hence, workability of the entire cleaning operation is poor. Poor workability can similarly happen even in a case of connecting optical connectors with each other via an optical connector adapter, such as an MPO optical connector.

In view of the above, a cleaning tool according to one or more embodiments is provided. Specifically, disclosed is a cleaning tool for cleaning a connecting end faces of a first optical connector and a second optical connector that is to be connected with the first optical connector, the cleaning tool including a first fitting portion that is to be fitted with the first optical connector and a cleaning portion including a cleaning face that is to come in contact with the connecting end faces of the second optical connector. According to this cleaning tool, workability of cleaning operation can be improved.

In one or more embodiments, the cleaning tool further includes a cleaning face that is to come in contact with the connecting end faces of the first optical connector when the first optical connector is fitted with the first fitting portion. Accordingly, it is possible to clean both the first optical connector and the second optical connector collectively.

In one or more embodiments, the cleaning tool further includes a second fitting portion that is to be fitted with the second optical connector. Accordingly, the cleaning tool can be fitted with the second optical connector.

In one or more embodiments, the cleaning portion includes a cleaning face that can come in contact with a plurality of the connecting end faces of the second optical connector collectively. Accordingly, the plurality of end-faces to be cleaned can be cleaned together, thereby being able to improve workability of the cleaning operation.

In one or more embodiments, the first optical connector includes a plurality of the connecting end faces, the second optical connector includes a plurality of the connecting end faces that are to be respectively connected to the plurality of connecting end faces of the first optical connector, and the cleaning portion includes a cleaning face that can come in contact with the plurality of connecting end faces of the first optical connector collectively and a cleaning face that can come in contact with the plurality of connecting end faces of the second optical connector collectively. Accordingly, workability of the cleaning operation for a multiple optical connector can also be improved.

In one or more embodiments, that the first optical connector is an optical connector provided on a printed board side, the second optical connector is an optical connector provided to a backplane side, and the cleaning tool is attachable to the printed board by fitting the first fitting portion and the first optical connector with each other. Accordingly, workability of the cleaning operation of the backplane optical connector disposed at a retreated position can be improved.

Disclosed is a cleaning method including: fitting a first fitting portion of a cleaning tool with a first optical connector to attach the cleaning tool to the first optical connector; and bringing a cleaning face of the cleaning tool into contact with a connecting end face of a second optical connector that is to be connected with the first optical connector, in a state where the cleaning tool is attached to the first optical connector. According to such a cleaning method, workability of the cleaning operation can be improved.

(3) A cleaning tool for an optical connector as described in Patent Literature 2 may be configured by inserting a cleaning body attached with an adhesive member as a cleaning member, into an optical connector housing in place of a ferrule. Accordingly, the cleaning body itself can be pushed rearward while being urged by a coil spring. However, when the adhesive member comes in contact with a connecting end face of a cleaning-target optical connector, the adhesive member is displaced in directions perpendicular to a direction of contact with respect to the connecting end face, and this may cause part of the adhesive member to be torn due to dust or the like. In such a case, the torn part of the adhesive member adheres to the connecting end face of the cleaning-target optical connector as a residue together with dust, which causes an increase in loss of optical signals. This phenomenon is particularly noticeable in a case that the dust or the like is a hard material, such as sand.

In view of the above, a cleaning tool according to one or more embodiments is provided. Specifically, disclosed is a cleaning tool for cleaning an optical connector that houses a ferrule in an optical connector housing such that the ferrule is able to retreat, the cleaning tool including the optical connector housing and a cleaning portion housed in the optical connector housing so as to be able to retreat, and the cleaning portion includes a flange part that is longer than a ferrule flange part of a ferrule in a direction of attaching/detaching of the cleaning tool and the optical connector, the ferrule being defined in at least one of IEC 61754-5 and JIS C 5981. According to such a cleaning tool, a residue of the adhesive member can be suppressed from adhering to the connecting end face of the cleaning-target optical connector.

In one or more embodiments, the cleaning tool further includes a coil spring that urges the cleaning portion so as to able to retreat, wherein a recessed part for housing at least part of the coil spring is provided in the flange part. Accordingly, even when the flange part of the cleaning portion is longer than the ferrule flange part in the attaching/detaching direction, it is possible to set the position at which the coil spring abuts on the flange part at the same position at which the coil spring abuts on the ferrule flange part.

In one or more embodiments, a protrusion protruding in the direction of attaching/detaching is provided to the flange part, and a length of the protrusion in the direction of attaching/detaching is equal to or greater than 1 mm. Accordingly, a residue of the adhesive member can be suppressed from adhering to the connecting end face of the cleaning-target optical connector.

Disclosed is a cleaning tool for cleaning an optical connector that houses a ferrule in an optical connector housing such that the ferrule is able to retreat, the cleaning tool including the optical connector housing and a cleaning portion housed in the optical connector housing so as to be able to retreat, and the cleaning portion includes a flange part that is greater in width than a ferrule flange part of a ferrule defined in at least one of IEC 61754-5 and JIS C 5981. According to such a cleaning tool, a residue of the adhesive member can be suppressed from adhering to the connecting end face of the cleaning-target optical connector.

In one or more embodiments, a gap between the flange part and an inner wall of the optical connector housing is smaller than a gap between the ferrule flange part and the inner wall of the optical connector housing. Accordingly, a residue of the adhesive member can be suppressed from adhering to the connecting end face of the cleaning-target optical connector.

In one or more embodiments, an adhesive member to contact the ferrule is provided at an end portion of the cleaning portion, the adhesive member being replaceable. Accordingly, it is possible to perform cleaning again only by replacing the adhesive member after cleaning, which can improve workability of the cleaning operation.

Disclosed is a cleaning method using a cleaning tool for cleaning an optical connector that houses a ferrule in an optical connector housing such that the ferrule is able to retreat, the cleaning method including: housing a cleaning portion in the optical connector housing such that the cleaning portion is able to retreat, the cleaning portion including a flange part that is longer than a ferrule flange part of a ferrule in a direction of attaching/detaching of the cleaning tool and the optical connector, the ferrule defined in at least one of IEC 61754-5 and JIS C 5981; and bringing the cleaning portion into contact with a connecting end face of the ferrule. According to such a cleaning tool, a residue of the adhesive member can be suppressed from adhering to the connecting end face of the cleaning-target optical connector.

Disclosed is a cleaning method using a cleaning tool for cleaning an optical connector that houses a ferrule in an optical connector housing such that the ferrule is able to retreat, the cleaning method including: housing a cleaning portion in the optical connector housing such that the cleaning portion is able to retreat, the cleaning portion including a flange part that is greater in width than a ferrule flange part of a ferrule defined in at least one of IEC 61754-5 and JIS C 5981; and bringing the cleaning portion into contact with a connecting end face of the ferrule. According to such a cleaning tool, a residue of the adhesive member can be suppressed from adhering to the connecting end face of the cleaning-target optical connector.

Overview

FIG. 1 is an explanatory diagram illustrating a cleaning tool 40 according to one or more embodiments. The cleaning tool 40 in FIG. 1 is an example of the application thereof to a backplane connector 50. FIG. 1 includes, in addition to the cleaning tool 40, optical fibers 13, optical connectors 11, a backplane housing 21 (also referred to as a BH housing below), and a printed-board housing 31 (also referred to as a PH housing below).

The backplane connector 50 is a plug-in type optical connector constituting an optical connector adapter for connecting a plurality of optical connectors 11 to each other. The backplane connector 50 connects the plurality of optical connectors 11 to each other by fitting the printed-board housing 31 attached to a printed board (not illustrated) with the backplane housing 21 attached to a backplane (not illustrated) of a plug-in unit (not illustrated).

The optical connectors 11 are connecting components provided to an end portion of the optical fibers 13 to optically connect the optical fibers 13 to each other. Each of the optical connectors 11 includes a ferrule 12 and an optical connector housing (not illustrated). The ferrule 12 is a member that holds the end portion of the corresponding optical fiber 13. A connecting end face of each of the ferrules 12 when the optical connectors 11 are optically connected is a ferrule endface 12A. Note that the ferrule endface may be referred to as the connecting end face.

Backplane housing holes 22 (22A to 22D) into which the optical connectors 11 are to be inserted are formed in the backplane housing 21 so as to penetrate the backplane housing 21. The plurality of backplane housing holes 22 are formed in the backplane housing 21, which allows the plurality of (four in FIG. 1) optical connectors 11 to be inserted into the backplane housing 21.

A plurality of printed-board housing holes 32 (32A to 32D) into which the plurality of optical connectors 11 are to be inserted are formed in the printed-board housing 31 so as to penetrate the printed-board housing 31. The printed-board housing holes 32 are formed, at positions to correspond to the backplane housing holes 22, respectively, in a state where the printed-board housing 31 and the backplane housing 21 are fitted with each other, which will be described later. When the optical connectors 11 are inserted into the respective backplane housing holes 22 and the respective printed-board housing holes 32, and the printed-board housing 31, the backplane housing 21 are fitted with each other, thereby bringing the ferrules 12 of the optical connectors 11 into abutment against each other, so that the plurality of optical connectors 11 are optically connected to each other. In other words, optical fibers of the plurality of optical connectors 11 are optically connected to each other. Note that, in one or more embodiments of the present invention, the cleaning tool 40 is inserted into the printed-board housing 31, thereby cleaning the ferrule endfaces 12A of the ferrules 12 of the plurality of optical connectors 11 that have been inserted into the backplane housing 21.

The cleaning tool 40 is a tool for cleaning the ferrule endfaces 12A, which are connecting end faces of the optical connectors 11. The cleaning tool 40 includes an adhesive portion 41, a base portion 42, leg portions 43, and engaging portions 44. Hereinafter, the base portion 42, the leg portions 43, and the engaging portions 44 are sometimes collectively referred to as an attachment 45.

The adhesive portion 41 is a member for causing dust to adhere. To cause dust to adhere, the adhesive portion 41 is formed of a member having self-adhesiveness. Here, the self-adhesiveness means that the adhesive strength of the adhesive portion 41 for another member is smaller than the breaking strength of the adhesive portion 41 and hence the material forming the adhesive portion 41 does not remain on the other member even when the adhesive portion 41 attached to the other member is removed. In one or more embodiments of the present invention, an adhesive face 41C is provided on an endface of the adhesive portion 41, the endface facing the ferrule endfaces 12A. By bringing the adhesive face 41C into contact with the ferrule endfaces 12A, dust on the ferrule endfaces 12A is caused to adhere to the adhesive face 41C to be consequently removed. Moreover, the adhesive portion 41 is formed so that, when the adhesive portion 41 is brought into contact with and then removed from the ferrule endfaces 12A, any part of the adhesive portion 41 would not remain on the ferrule endfaces 12A.

To cause dust to adhere, the adhesive portion 41 is formed of a member made of silicone adhesive, the member having self-adhesiveness. The adhesive portion 41 may be constituted, for example, by mixing adhesive into a main agent. As the main agent, polyolefin, such as polyethylene, polypropylene, or the like, copolymer including monomer, or the like can be used, for example. As the adhesive to be mixed with the main agent, natural rubber, synthetic rubber such as butyl rubber, acrylic rubber, or the like, or mixture of polyvinyl chloride and plasticizer, or the like can be used for example.

The base portion 42 is a portion that holds the adhesive portion 41. It is possible to press the adhesive portion 41 against the ferrule endfaces 12A by allowing the base portion 42 to hold the adhesive portion 41. The width of an endface of the base portion 42 is formed to be greater than that of a region in which the ferrule endfaces 12A of the plurality of optical connectors 11 are disposed in the backplane housing 21. This allows the adhesive portion 41 to be integrally formed to come into contact with the plurality of ferrule endfaces 12A collectively. However, the cleaning tool 40 may not necessarily include the base portion 42.

The leg portions 43 are portions for allowing the cleaning tool 40 to be inserted into the printed-board housing 31. As illustrated in FIG. 1, the two leg portions 43 are inserted into the two printed-board housing holes 32B and 32C, which are located at positions near the center, among the four printed-board housing holes 32A to 32D formed in the printed-board housing 31. However, the number of leg portions 43 and the positions of the printed-board housing holes 32 into which the leg portions 43 are inserted are not limited thereto. For example, the leg portions 43 may be inserted into the printed-board housing holes 32A and 32D, which are located at the respective side positions. However, the cleaning tool 40 may not necessarily include the leg portions 43.

The engaging portions 44 are portions that allow the cleaning tool 40 to be engaged with the printed-board housing 31. The engaging portions 44 are formed at end portions of the leg portions 43 opposite to the end portions at which the adhesive portion 41 is formed. The engaging portions 44 prevent the cleaning tool 40 from falling off from the printed-board housing 31 due to the adhesive force between the adhesive face 41C and the ferrule endfaces 12A when the adhesive face 41C is brought into contact with and then removed from the ferrule endfaces 12A. However, the cleaning tool 40 may not necessarily include the engaging portions 44.

Cleaning Method with Cleaning Tool 40

Figure 2A:
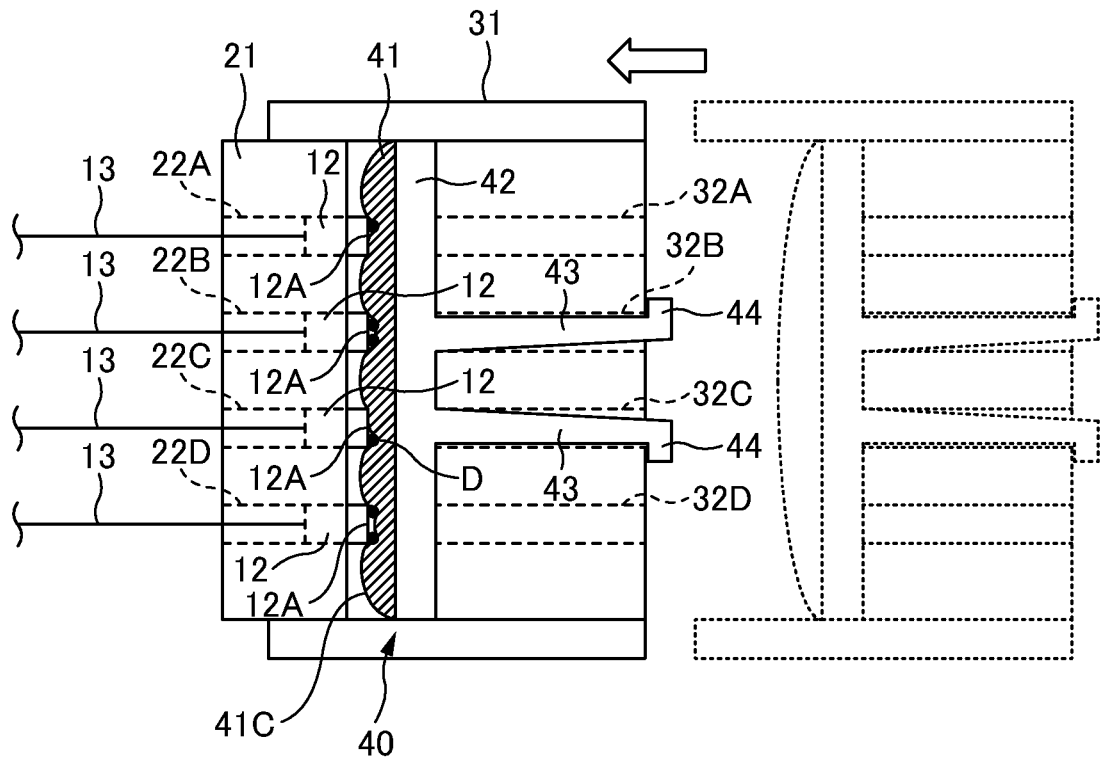
FIG. 2A is an explanatory diagram illustrating a state of the cleaning tool 40 when a backplane housing 21 and a printed-board housing 31 are fitted with each other.
Figure 2B:
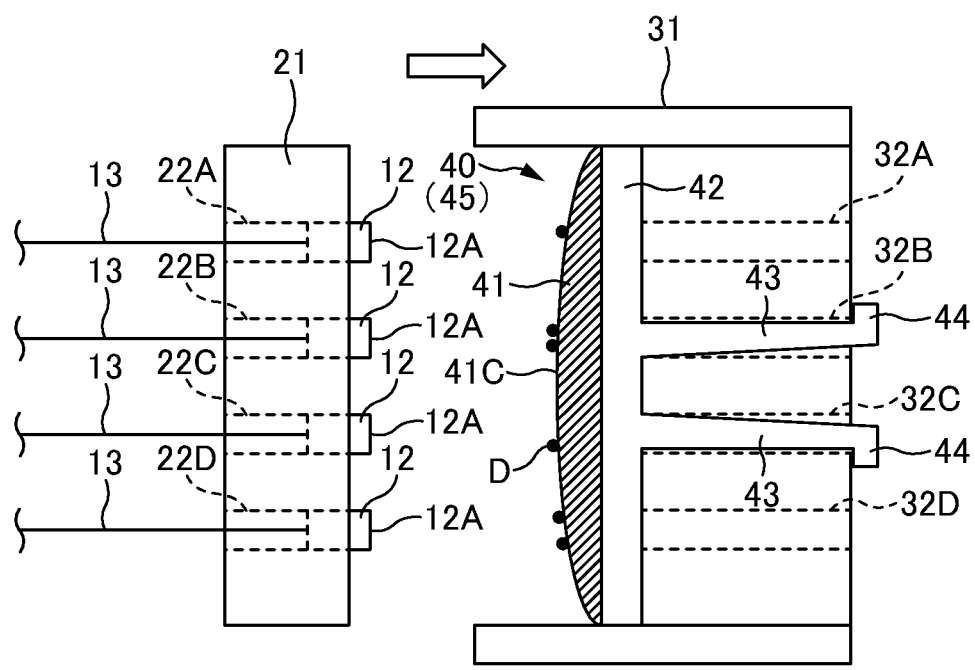
FIG. 2B is an explanatory diagram illustrating a state of the cleaning tool 40 when fitting of the backplane housing 21 and the printed-board housing 31 is released.

FIG. 2A is an explanatory diagram illustrating a state of the cleaning tool 40 in a state where the backplane housing 21 and the printed-board housing 31 are fitted with each other. FIG. 2B is an explanatory diagram illustrating a state of the cleaning tool 40 in a state where the backplane housing 21 and the printed-board housing 31 are separated from each other (fitting is released). In the following, a description will be given of a method in which the cleaning tool 40 according to one or more embodiments of the present invention cleans dust D adhering to the ferrule endfaces 12A.

As illustrated in FIG. 2A, since the cleaning tool 40 is inserted into the printed-board housing 31, the backplane housing 21 and the printed-board housing 31 are fitted with each other, thereby bringing the adhesive face 41C of the cleaning tool 40 into contact with the plurality of ferrule endfaces 12A collectively. In this operation, the adhesive face 41C is pressed by the base portion 42 such that the adhesive face 41*C comes* into contact with the entire surfaces of the plurality of ferrule endfaces 12A. With the adhesive face 41C coming into contact with the plurality of ferrule endfaces 12A, the dust D on the ferrule endfaces 12A is caused to adhere to the adhesive face 41C. Note that the backplane housing 21 and the printed-board housing 31 are fitted with each other by inserting the printed board fixed with the printed-board housing 31 into the plug-in unit and inserting the printed-board housing 31 into the backplane housing 21 attached to the backplane.

Next, as illustrated in FIG. 2B, the backplane housing 21 and the printed-board housing 31 are separated from each other (fitting is released), and thereby the adhesive face 41C of the cleaning tool 40 is removed from the ferrule endfaces 12A. In this operation, the dust D adhering to the ferrule endfaces 12A is removed due to the self-adhesiveness of the adhesive face 41C and adheres to the adhesive face 41C. Note that the backplane housing 21 and the printed-board housing 31 are separated from each other by pulling the printed board out from the plug-in unit.

Method of Replacing Adhesive Portion 41

The adhesive portion 41 is integrally formed with the cleaning cool 40. Hence, by removing and inserting the entire cleaning tool 40 from and into the printed-board housing 31, the adhesive portion 41 can be replaced easily. In the following, the cleaning tool 40 whose adhesive face 41C has contact the plurality of ferrule endfaces 12A and been removed from the ferrule endfaces 12A once or more times is sometimes referred to as the "used" cleaning tool 40. Moreover, the cleaning tool 40 whose adhesive face 41C has not contact the plurality of ferrule endfaces 12A or been removed from the ferrule endfaces 12A even once is sometimes referred to as the "unused" cleaning tool 40. In a case that cleaning is performed using the unused cleaning tool 40 and the cleaning tool 40 turns into the used cleaning tool 40, the adhesive force of the adhesive face 41C may be decreased due to adhesion of the dust D to the adhesive face 41C of the cleaning tool 40. In this case, the used cleaning tool 40 needs to be replaced with the unused cleaning tool 40.

As described above, since the cleaning tool 40 is engaged with the printed-board housing 31 using the engaging portions 44, it is not possible to remove the cleaning tool 40 remaining in this state from the printed-board housing 31. Thus, by moving the two engaging portions 44 toward a central position to be close to each other, engagement with the printed-board housing 31 can be released so that the leg portions 43 can be pulled out from the printed-board housing holes 32. When the cleaning tool 40 is inserted into the printed-board housing 31, the leg portions 43 of the cleaning tool 40 are inserted into the printed-board housing holes 32 while the two engaging portions 44 are being moved toward the central position to be close to each other.

Method for Identifying Whether or not Cleaning Tool 40 has been Used

Figure 3A:
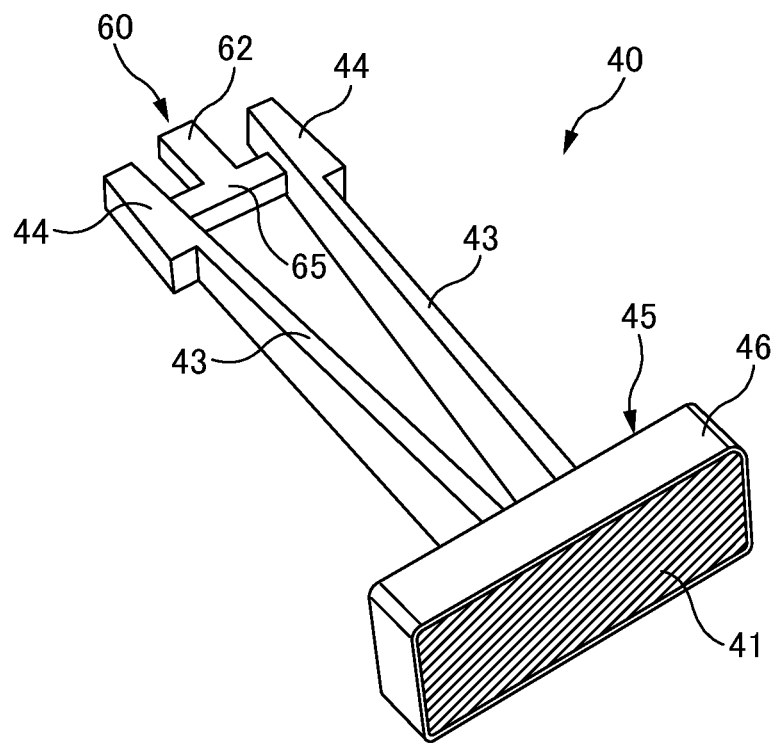
FIG. 3A is a perspective view illustrating the cleaning tool 40 in an unused state.

FIG. 3A is a perspective view illustrating the cleaning tool 40 in the unused state. In the following, a method for identifying whether the cleaning tool 40 is in the "unused" state or the "used" state will be described. Note that, in the cleaning tool 40 in FIG. 3A as well as FIGS. 3B, 4A, 4B, and 4C to be described later, a side wall part 46 is provided to the base portion 42 as a part that holds the adhesive portion 41. This clearly defines a region where the adhesive portion 41 is to be formed, which facilitates formation of the adhesive portion 41 on the base portion 42.

As illustrated in FIG. 3A, an identifying portion 60 is provided to the cleaning tool 40. The identifying portion 60 includes abridge 65 and a protrusion 62. The identifying portion 60 is a member for identifying whether the cleaning tool 40 is in the "unused" state or the "used" state. The cleaning tool 40 is a T-shaped member and is provided in such a manner as to bridge a gap between the two leg portions 43. The bridge 65 is a portion that bridges the gap between the two leg portions 43. A connecting portion between the bridge 65 and each of the leg portions 43 may be formed to be thinner than portions other than the connecting portion, to allow the connecting portion to be cut easily when the identifying portion 60 is to be detached which will be described later. The protrusion 62 is a protruded part provided to the bridge 65.

At the time of cleaning the optical connectors 11, each of the two leg portions 43 of the cleaning tool 40 is inserted into any of the printed-board housing holes 32. As described above, the identifying portion 60 is provided between the two leg portions 43. Accordingly, it is not possible to insert each of the two leg portions 43 of the cleaning tool 40 into any of the printed-board housing holes 32 with the identifying portion 60 being attached. Hence, an operator who is to clean the optical connectors 11 first detaches the identifying portion 60 from the cleaning tool 40 and then inserts each of the two leg portions 43 into any of the printed-board housing holes 32.

Figure 3B:
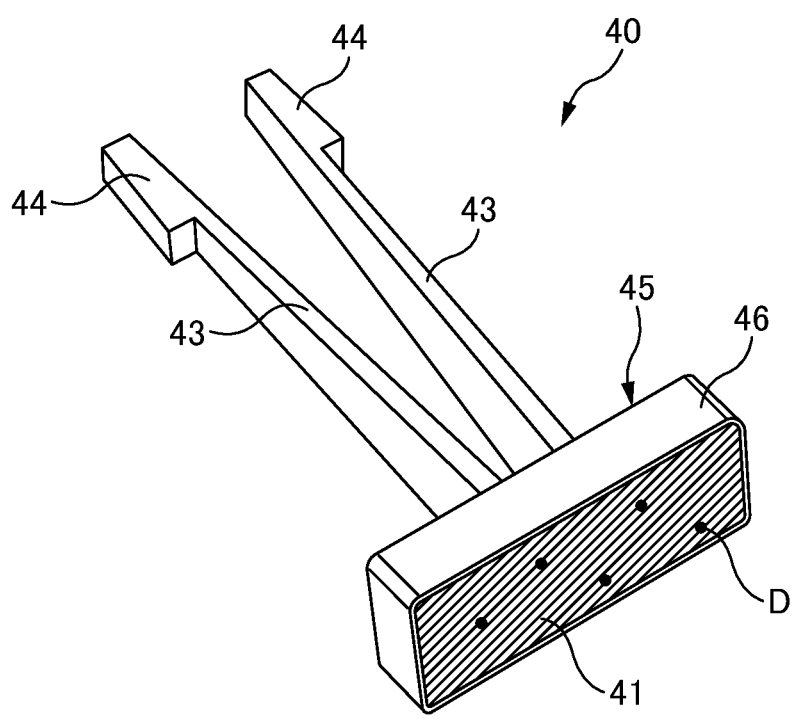
FIG. 3B is a perspective view illustrating the cleaning tool 40 in a used state.

FIG. 3B is a perspective view illustrating the cleaning tool 40 in the used state. The used cleaning tool 40 is in a state where the identifying portion 60 has been detached. This allows each of the two leg portions 43 to be inserted into any of the printed-board housing holes 32. To detach the identifying portion 60, the operator presses the protrusion 62, rotates the protrusion 62 about an axis of the bridge 65, or the like, to thereby cut the connecting portions between the bridge 65 and the leg portions 43. Accordingly, the used cleaning tool 40 results in a state where the identifying portion 60 has been detached. Depending on the presence of absence of the identifying unit 60, it is possible to identify whether the cleaning tool 40 is in the "unused" state or the "used" state.

In FIGS. 3A and 3B, by providing the identifying portion 60 bridging the gap between the two leg portions 43, it is possible to identify whether the cleaning tool 40 is in the "unused" state or the "used" state. However, a member for such identification is not limited to this. For example, a configuration may be such that a claw-like member is formed in one of the two leg portions 43 and when the cleaning tool 40 is used, i.e., when each of the two leg portions 43 is inserted into any of the printed-board housing holes 32, the claw-like member is to be broken. In addition to the above, any other members may be used as long as they can identify whether the cleaning tool 40 is in the "unused" state or the "used" state.

Variations of Base Portion 42

Figure 4A:
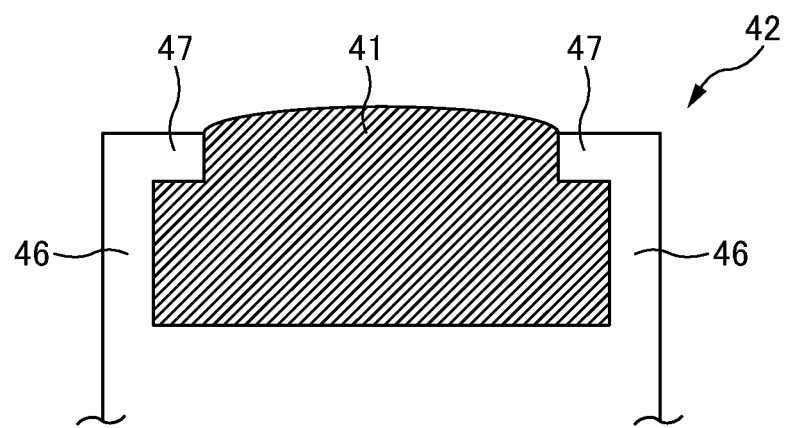
FIGS. 4A to 4C are cross-sectional views illustrating variations of a base portion 42 according to one or more embodiments.
Figure 4B:
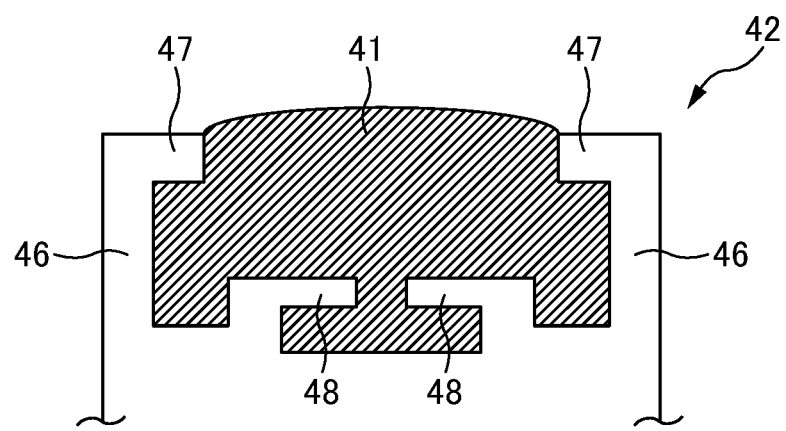
Figure 4C:
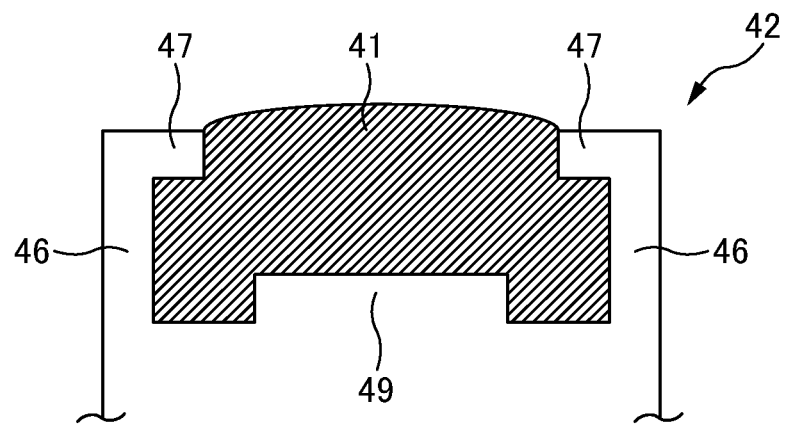

FIGS. 4A to 4C are cross-sectional views illustrating variations of the base portion 42 according to one or more embodiments. As described above, the adhesive portion 41 held with the base portion 42 is formed of a member having self-adhesiveness, so as to cause dust to adhere to the adhesive portion 41. However, in a case that the adhesive force between the adhesive portion 41 and the ferrule endfaces 12A is greater than the holding force of holding the adhesive portion 41 by the base portion 42, the adhesive portion 41 may possibly be pulled out from the base portion 42. To suppress the adhesive portion 41 from being pulled out from the base portion 42 as such, the holding force of holding the adhesive portion 41 by the base portion 42 needs to be increased. Here, change in shape of the base portion 42 can further increase the holding force of holding the adhesive portion 41. Variations of such a change in shape of the base portion 42 will be described below.

In the base portion 42 in FIG. 4A, an eaves part 47 to partially cover the adhesive portion 41 is provided at the end portion of the side wall part 46. This makes it possible to prevent the adhesive portion 41 from falling off from the base portion 42 due to the adhesive force between the adhesive portion 41 and the ferrule endfaces 12A when the adhesive face 41C is brought into contact with and then removed from the ferrule endfaces 12A.

In the base portion 42 in FIG. 4B, inner engagement pieces 48 are further provided in addition to the structure of the base portion 42 in FIG. 4A, the inner engagement pieces 48 engaging the adhesive portion 41 at an inner space of the base portion 42. This makes it possible to prevent the adhesive portion 41 from falling off from the base portion 42 due to the adhesive force between the adhesive portion 41 and the ferrule endfaces 12A when the adhesive face 41C is brought into contact with and then removed from the ferrule endfaces 12A.

In the base portion 42 in FIG. 4C, an inner protrusion 49 is further provided in an inner space of the base portion 42 in addition to the structure of the base portion 42 in FIG. 4A. This makes it possible to prevent the adhesive portion 41 from falling off from the base portion 42 due to the adhesive force between the adhesive portion 41 and the ferrule endfaces 12A when the adhesive face 41C is brought into contact with and then removed from the ferrule endfaces 12A.

Modified Example

In the above-described embodiments, the cleaning tool 40 is inserted into the printed-board housing 31 to clean the ferrule endfaces 12A of the ferrules 12 of the plurality of optical connectors 11 inserted into the backplane housing 21. However, the cleaning tool 40 may be inserted into the backplane housing 21 to clean the ferrule endfaces 12A of the ferrules 12 of the plurality of optical connectors 11 inserted into the printed-board housing 31.

Figure 5A:
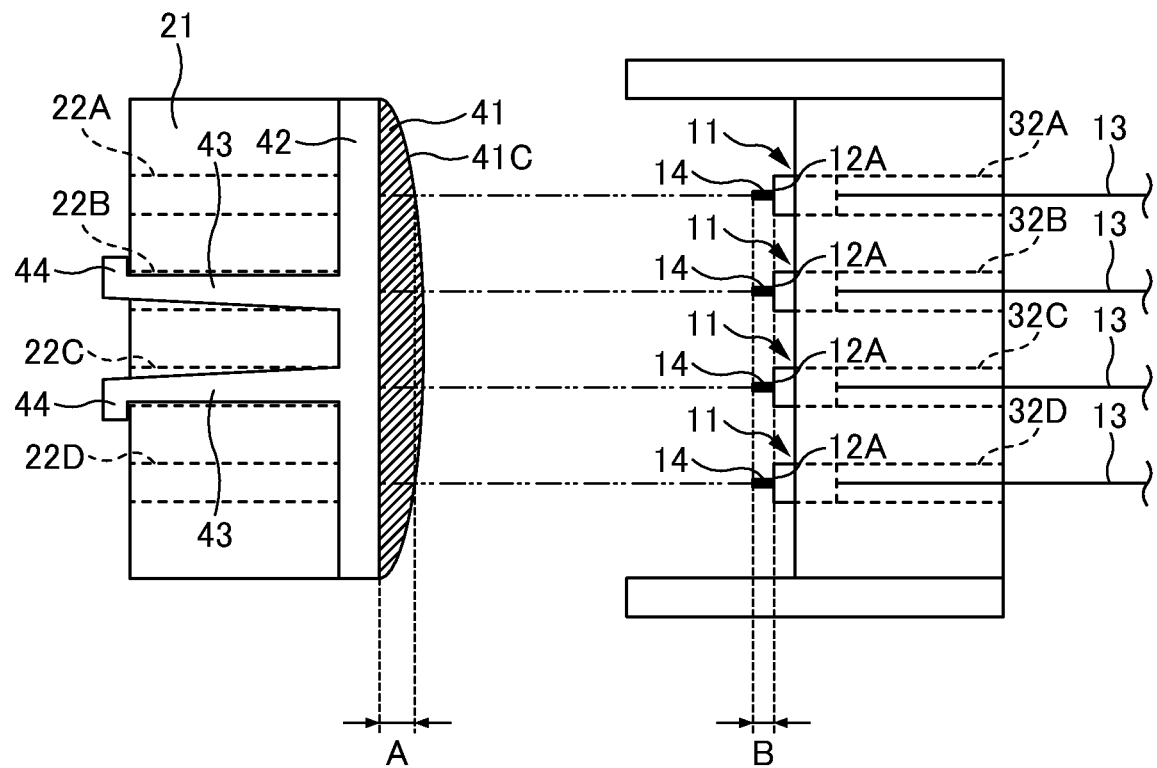
FIG. 5A is an explanatory diagram illustrating a cleaning tool 40 according to a modified example of one or more embodiments.

FIG. 5A is an explanatory diagram illustrating a cleaning tool 40 according to a modified example of one or more embodiments. In the present modified example, the cleaning tool 40 is inserted into the backplane housing 21 side, and moreover, ferrule pins 14 are provided to the ferrules 12 of the optical connectors 11 inserted into the printed-board housing 31. Hence, the adhesive body 41 according to the present modified example is to come into contact with the ferrule endfaces 12A from which the ferrule pins 14 protrude. In order to allow the adhesive body 41 to come into contact with the ferrule endfaces 12A, the thickness (A in FIG. 5A) of the portion of the adhesive body 41 where the ferrule pins 14 are to be stuck may be greater than the protruding length (B in FIG. 5A) of the ferrule pins 14. This can prevent the ferrule pins 14 from hitting against the base portion 42 and the like and being damaged, even if the backplane housing 21 and the printed-board housing 31 are fitted with each other such that the adhesive face 41C of the cleaning tool 40 comes into contact with the ferrule endfaces 12A. Note that the protruding length (B in FIG. 5A) of the ferrule pins 14 may be simply referred to as "the length of ferrule pins".

Figure 5B:
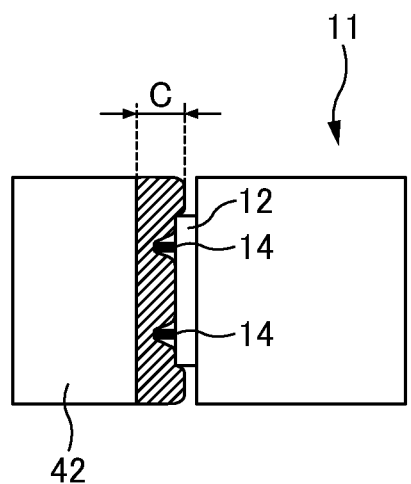
FIG. 5B is an explanatory diagram illustrating a state where an adhesive face 41C is in contact with ferrule endfaces 12A of the optical connectors 11.

FIG. 5B is an explanatory diagram illustrating a state where the adhesive face 41C is in contact with the ferrule endfaces 12A of the optical connectors 11. For ease of description, FIG. 5B illustrates a state of contact between the adhesive body 41 and the optical connector 11 inserted into the printed-board housing hole 32A, when viewed from above. When the adhesive body 41 comes into contact with the ferrule endface 12A, the ferrule pins 14 stick in the adhesive body 41. The adhesive body 41 may have softness to such an extent that the thickness (C in FIG. 5A) of the adhesive body would be greater than A in FIG. 5A since portions of the adhesive body 41 where the ferrule pins 14 stick are pushed aside. This enables an increase in the area of the portion where the adhesive face 41C comes in contact with the cleaning-target ferrule endfaces 12A.

Figure 6:
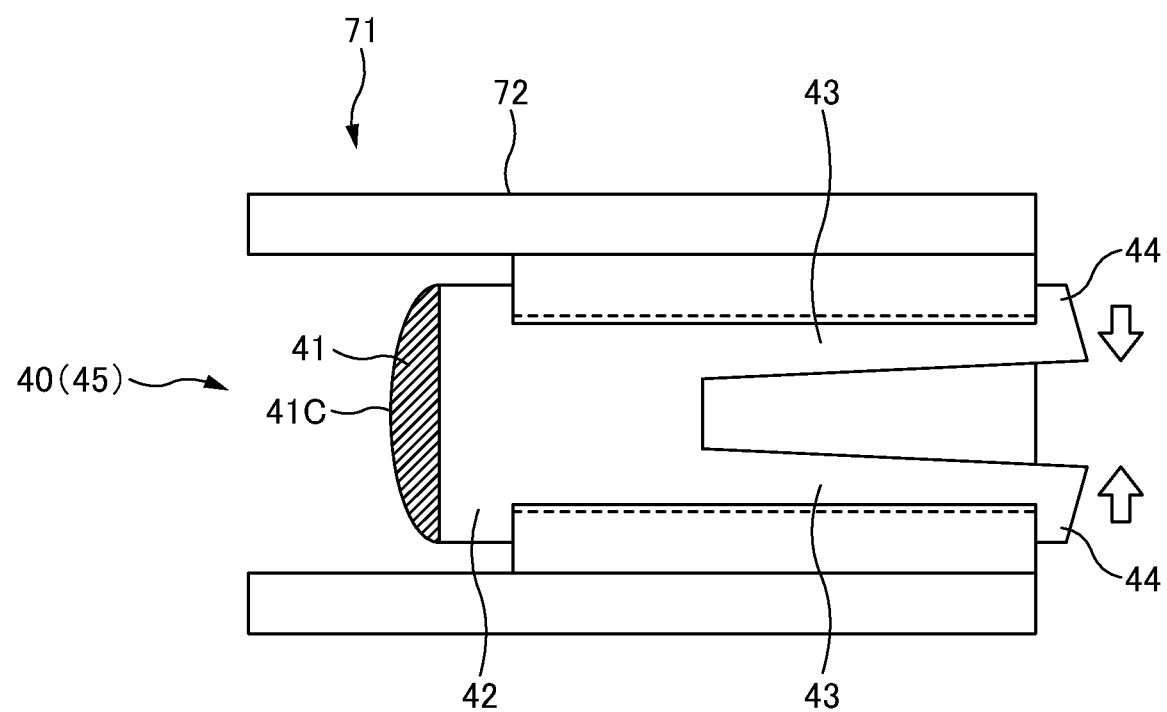
FIG. 6 is an explanatory diagram illustrating a cleaning tool 40 according to one or more embodiments.

FIG. 6 is an explanatory diagram illustrating a cleaning tool 40 according to one or more embodiments. The cleaning tool 40 according to one or more embodiments is an example of application to the backplane connector 50 that connects a plurality of optical connectors collectively. However, the cleaning tool 40 may be applied to a single optical connector 71. The optical connector 71 according to one or more embodiments of the present invention may be a mechanically transferable (MT) optical connector (MT optical connector defined in at least one of IEC 61754-5 and JIS C 5981). Alternatively, the optical connector 71 may be an MPO optical connector (F13 multicore optical fiber connector defined in at least one of IEC 61754-7 and JIS C 5982).

As illustrated in FIG. 6, an attachment 45 of the cleaning tool 40 according to one or more embodiments of the present invention is inserted into an inner space of a connector housing 72. Engaging portions 44 that engage the cleaning tool 40 with the connector housing 72 are formed at end portions of leg portions 43 opposite to end portions at which an adhesive portion 41 is formed. To remove the cleaning tool 40 from the connector housing 72, the two engaging portions 44 are moved toward a central position to be close to each other as illustrated with arrows in FIG. 6, to thereby release the engagement from the connector housing 72. Accordingly, the leg portions 43 can be pulled out from inner space of the connector housing 72. Note that the connector housing 72 may be a housing formed for cleaning.

First Modified Example

Figure 7A:
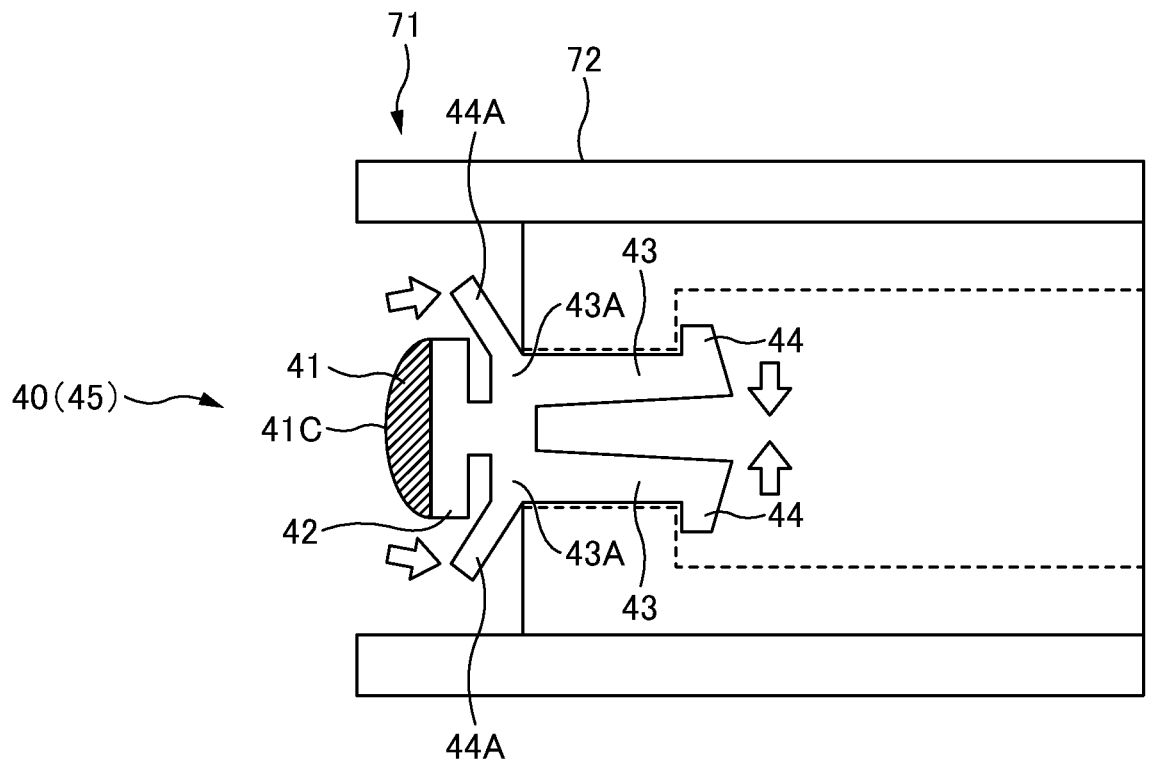
FIG. 7A is an explanatory diagram illustrating a cleaning tool 40 according to a first modified example of one or more embodiments.

FIG. 7A is an explanatory diagram illustrating a cleaning tool 40 according to a first modified example of one or more embodiments. In the case of the above-described cleaning tool 40 illustrated in FIG. 6, to remove the cleaning tool 40 from the connector housing 72, the two engaging portions 44 provided in a rear portion of the cleaning tool 40 are moved toward the central position to be close to each other, to thereby release the engagement. However, the release of the engagement may be performed using engagement release pieces 44A provided at end portions of the leg portions 43 on the same side as the side provided with the adhesive portion 41.

The engagement release pieces 44A are provided at the end portions of the leg portions 43 of the attachment 45 on the same side as the side provided with the adhesive portion 41, so as to protrude. In addition, a neck part 43A is formed at a connecting portion among the engagement release pieces 44A, the leg portions 43, and the base portion 42. Hence, when the neck part 43A is elastically deformed, the engagement release pieces 44A and the leg portions 43 can be moved integrally in directions toward the center of the cleaning tool 40. Specifically, by pressing the engagement release pieces 44A in directions of arrows in FIG. 7A, the engaging portions 44 provided at rear ends of the leg portions 43 are moved toward the central portion to thereby release the engagement. This facilitates release of engagement of the cleaning tool 40 even when there is no sufficient space for releasing engagement with the end portions of the leg portions 43 opposite to that with the adhesive portion 41.

Second Modified Example

Figure 7B:
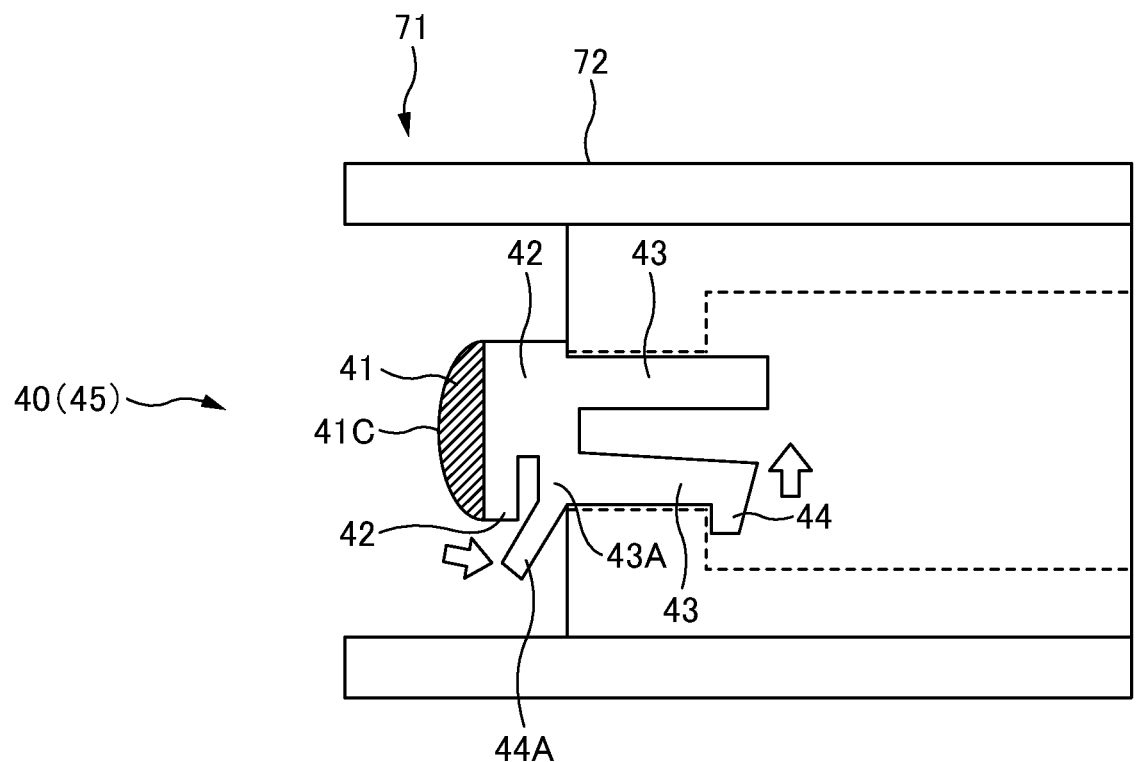
FIG. 7B is an explanatory diagram illustrating a cleaning tool 40 according to a second modified example of one or more embodiments.

FIG. 7B is an explanatory diagram illustrating a cleaning tool 40 according to a second modified example of one or more embodiments. The cleaning tool illustrated in FIG. 7A is provided with the engaging portions 44 (engagement release pieces 44A) on both sides. However, the engaging portion 44 (engagement release piece 44A) may be provided only on one of the sides.

Figure 8A:
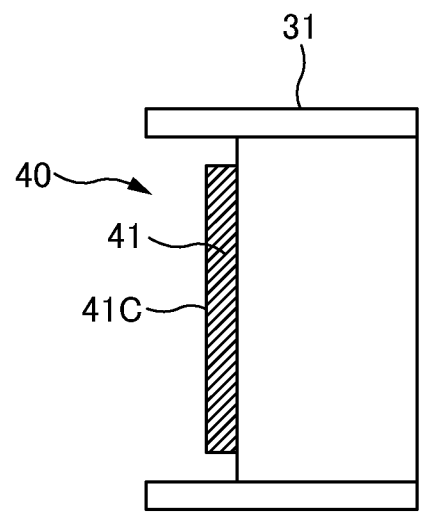
FIG. 8A is an explanatory diagram illustrating a cleaning tool 40 according to one or more embodiments.

FIG. 8A is an explanatory diagram illustrating a cleaning tool 40 according to one or more embodiments. In the cleaning tool 40 according to each of the one or more embodiments described above, the adhesive portion 41 is formed in the attachment 45. However, in the cleaning tool 40 according to one or more embodiments of the present invention, an adhesive portion 41 may be formed directly in a backplane housing 21 (or a printed-board housing 31). Note that the backplane housing 21 (or the printed-board housing 31) may be provided as a housing for cleaning.

First Modified Example

Figure 8B:
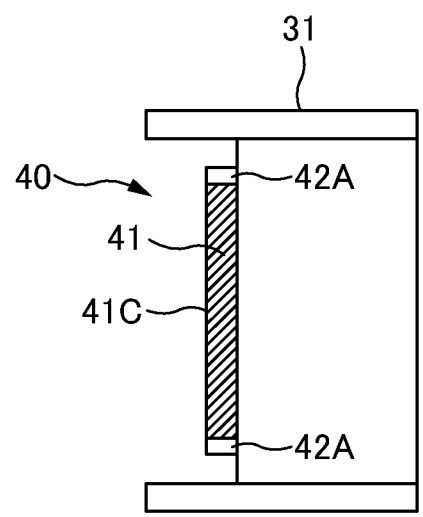
FIG. 8B is an explanatory diagram illustrating a cleaning tool 40 according to a first modified example of one or more embodiments.

FIG. 8B is an explanatory diagram illustrating a cleaning tool 40 according to a first modified example of one or more embodiments. In the cleaning tool 40 according to the present modified example, a frame part 42A is provided in the backplane housing 21 (or the printed-board housing 31), and the adhesive portion 41 is provided inside the frame part 42A. Accordingly, when the adhesive portion 41 is formed, the frame part 42A is used to mold the adhesive portion 41 by pouring the adhesive portion 41 inside the frame part 42A. This improves workability when forming the adhesive portion 41. Moreover, at the time of replacement, the adhesive portion 41 can be removed together with the entire frame part 42A. This improves workability at the time of replacing the adhesive portion 41.

Second Modified Example

Figure 8C:
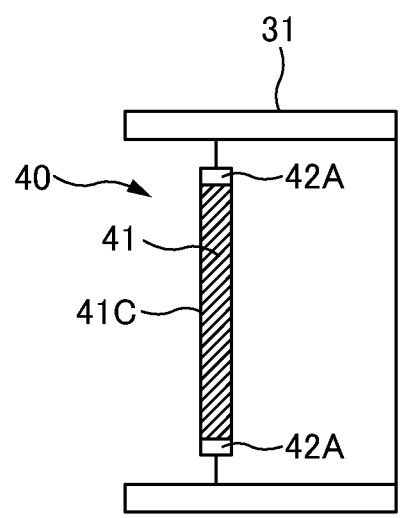
FIG. 8C is an explanatory diagram illustrating a cleaning tool 40 according to a second modified example of one or more embodiments.

FIG. 8C is an explanatory diagram illustrating a cleaning tool 40 according to a second modified example of one or more embodiments. The cleaning tool 40 according to the present modified example is similar to the first modified example in that the frame part 42A is provided in the backplane housing 21 (or the printed-board housing 31) and the adhesive portion 41 is provided inside the frame part 42A. However, in the present modified example, the adhesive portion 41 and the frame part 42A are housed at a retreated position in the backplane housing 21 (or the printed-board housing 31).

First, a description will be given of a structure and a connection method of a cleaning-target backplane connector, as illustrated in FIGS. 12 A and 12B. Thereafter, a description will be given of a structure of a cleaning tool according to one or more embodiments and a cleaning method using the cleaning tool.

Structure of Backplane Connector

Figure 12A:
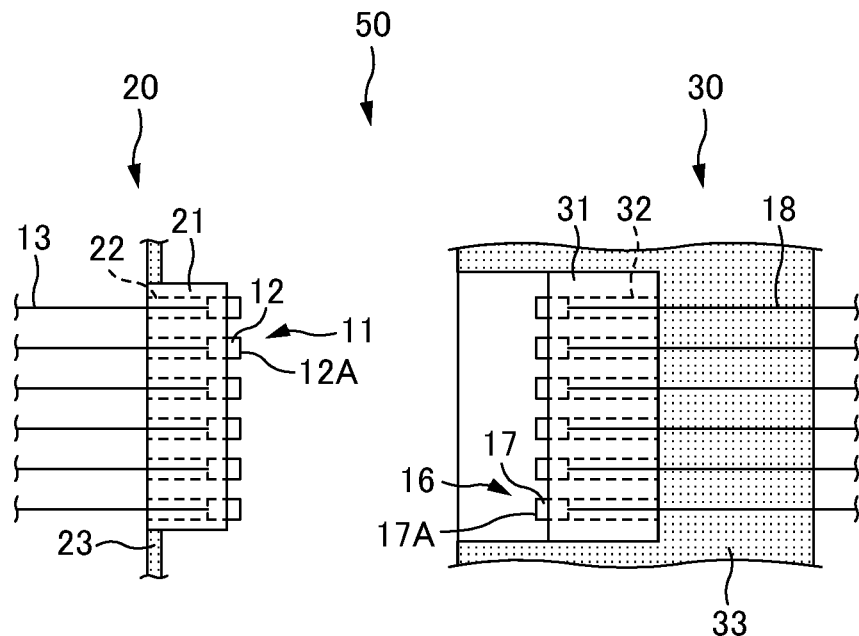
FIGS. 12A and 12B are explanatory diagrams illustrating a structure and a connecting method of a backplane connector 50.
Figure 12B:
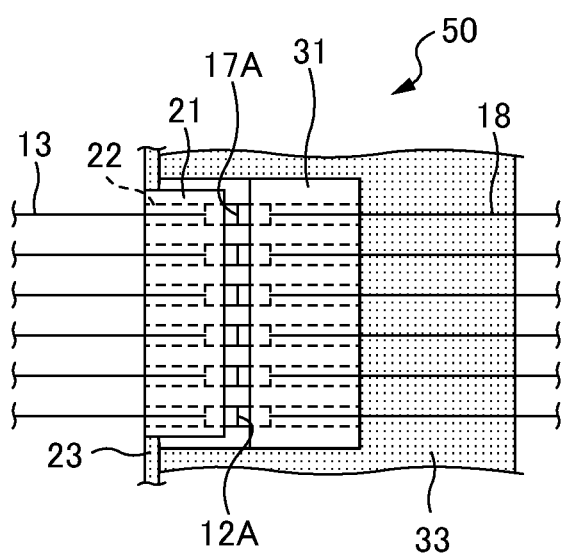

FIGS. 12A to 12B are explanatory diagrams illustrating a structure of a backplane connector 50. The backplane connector 50 includes a backplane optical connector 20 and a printed-board optical connector 30. The backplane optical connector 20 is an optical connector provided on a backplane 23 side and includes a plurality of optical connectors 11 and a backplane housing 21 (also referred to as a BH housing below) that houses the plurality of optical connectors 11. The printed-board optical connector 30 is an optical connector provided on a printed board 33 side and includes a plurality of optical connectors 16 and a printed-board housing 31 (also referred to as a PH housing below) that houses the plurality of optical connectors 16. Each of the backplane optical connector 20 and the printed-board optical connector 30 includes the plurality of optical connectors (11, 16) and is hence sometimes referred to as a multiple optical connector. Note that the backplane optical connectors 11 are provided at respective end portions of optical fibers 13. Moreover, the printed-board optical connectors 16 are provided at respective end portions of optical fibers 18.

The backplane connector 50 is a plug-in type optical connector constituting an optical connector adapter for connecting the plurality of backplane optical connectors 11 and the plurality of printed-board optical connectors 16. The backplane connector connects the plurality of optical connectors 11 and the plurality of optical connectors 16, respectively, by fitting the PH housing 31 attached to the printed board 33 with the BH housing 21 attached to the backplane 23 of a plug-in unit (not illustrated).

The optical connectors 11 are connecting components provided to end portions of the respective optical fibers 13 to optically connect the optical fibers 13 and the optical fibers 18 to each other, respectively, via the optical connectors 16. Each of the optical connectors 11 includes a ferrule 12 and an optical connector housing (not illustrated). The ferrule 12 is a member that holds the end portion of the corresponding optical fiber 13. A ferrule endface 12A of the ferrule 12 serves as a connecting end face of the optical connector 11. Moreover, the ferrule endface 12A of the ferrule 12 serves also as a connecting end face of the backplane optical connector.

In the BH housing 21, backplane housing holes 22 are formed so as to penetrate the BH housing 21. The optical connectors 11 are to be inserted into the backplane housing holes 22. The plurality of backplane housing holes 22 are formed in the BH housing 21, which allows the plurality of (six in FIGS. 12A and 12B) optical connectors 11 to be inserted into the BH housing 21.

The optical connectors 16 are connecting components provided to end portions of the respective optical fibers 18 to optically connect the optical fibers 18 and the optical fibers 13 to each other, respectively, via the optical connectors 11. Each of the optical connectors 16 includes a ferrule 17 and an optical connector housing (not illustrated). The ferrule 17 is a member that holds the end portion of the corresponding optical fiber 18. A ferrule endface 17A of the ferrule 17 serves as a connecting end face of the optical connector 16. Moreover, the ferrule endface 17A of the ferrule 17 serves also as a connecting end face of the printed-board optical connector.

In the PH housing 31, printed-board housing holes 32 are formed so as to penetrate the PH housing 31. The optical connectors 16 are to be inserted into the printed-board housing holes 32, respectively. The plurality of printed-board housing holes 32 are formed in the PH housing 31, which allows the plurality of (six in FIGS. 12A and 12B) optical connectors 16 to be inserted into the PH housing 31. The printed-board housing holes 32 are formed at positions to correspond to the respective backplane housing holes 22 in a state where the PH housing 31 and the BH housing 21 are fitted with each other. The optical connectors 11 are inserted into the respective backplane housing holes 22, and the optical connectors 16 are inserted into the respective printed-board housing holes 32. When the printed board 33 is slid to be moved to fit the PH housing 31 and the BH housing 21 with each other, the ferrules 12 of the optical connectors 11 and the ferrules 17 of the optical connectors 16 abut on each other to thereby optically connect the plurality of optical connectors 11 and the plurality of optical connectors 16. In other words, the optical fibers 13 of the plurality of optical connectors 11 and the optical fibers 18 of the plurality of optical connectors 16 are optically connected to each other.

Structure of Cleaning Tool

Figure 9A:
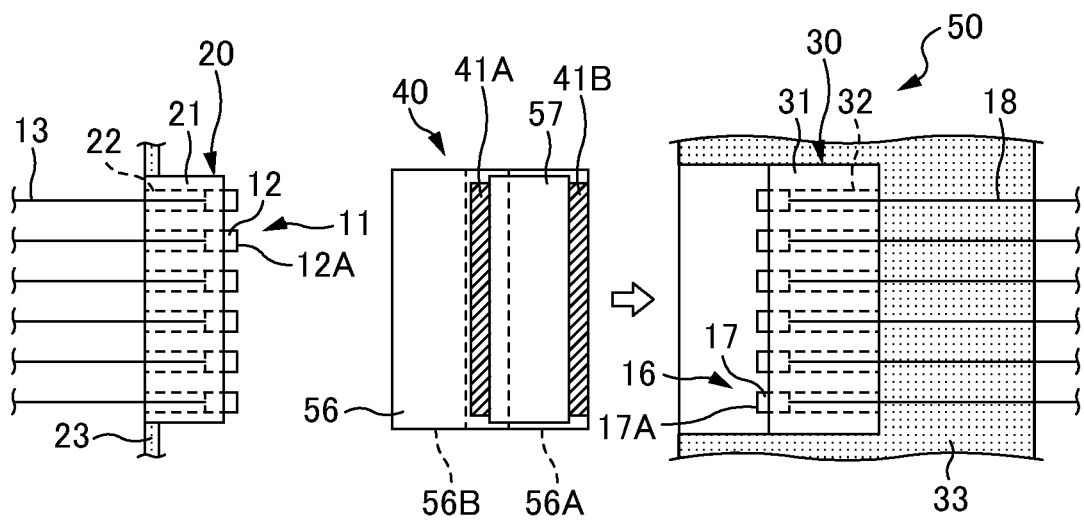
FIGS. 9A to 9C are explanatory diagrams illustrating a cleaning tool 40 according to one or more embodiments.
Figure 9B:
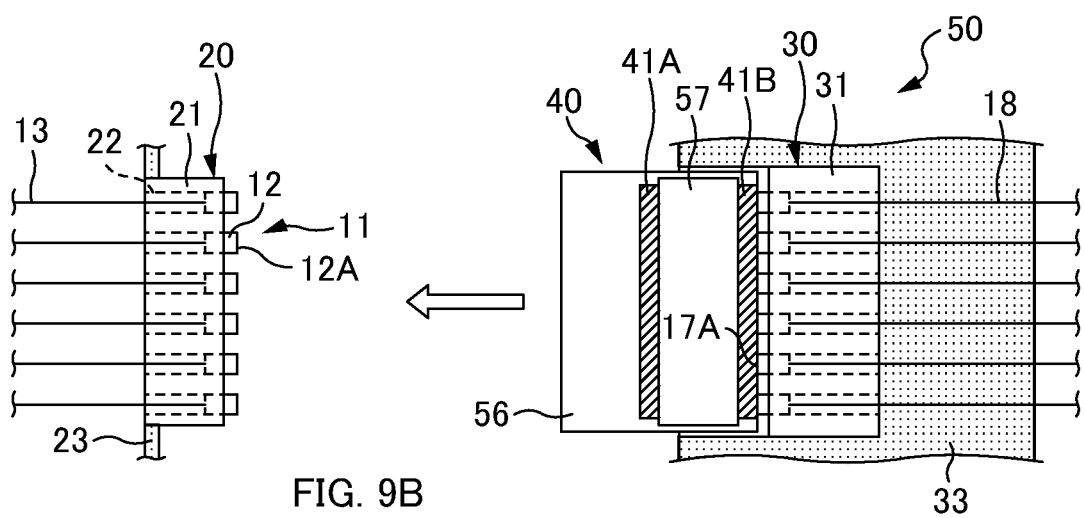
Figure 9C:
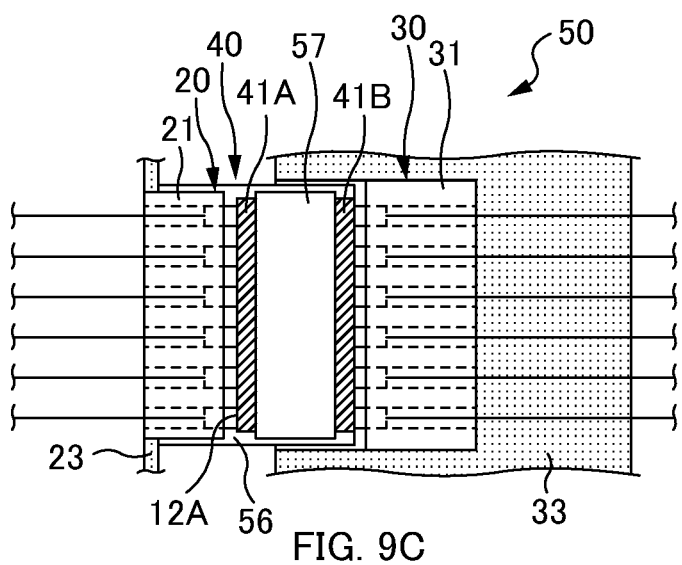

FIGS. 9A to 9C are explanatory diagrams illustrating the cleaning tool 40 according to one or more embodiments. FIGS. 9A to 9C illustrate states of cleaning the backplane connector 50 by using the cleaning tool 40. FIGS. 9A to 9C include the above-described backplane optical connector and printed-board optical connector in addition to the cleaning tool 40.

The cleaning tool 40 is a tool for cleaning the ferrule endfaces 12A, which are connecting end faces of the optical connectors 11. The cleaning tool 40 is also a tool for cleaning the ferrule endfaces 17A, which are connecting end faces of the optical connectors 16. The cleaning tool 40 includes a cleaner housing 56, cleaning portions 41A and 41B, and a cleaning unit holding portion 57.

The cleaner housing 56 is a member that houses therein the cleaning portions 41A and 41B and the cleaning unit holding portion 57 and that is to be fitted with the PH housing 31 or the BH housing 21 at the time of cleaning. In the cleaner housing 56, a printed-board fitting portion 56A that is to be fitted with the PH housing 31 is provided. Note that, with the printed-board fitting portion 56A having the same shape as a fitting portion of the BH housing 21 to be fitted with the PH housing 31, the printed-board fitting portion 56A can be fitted with the PH housing 31 easily. In the cleaner housing 56, a backplane fitting portion 56B that is to be fitted with the BH housing 21 is provided. With the backplane fitting portion 56B having the same shape as a fitting portion of the PH housing 31 to be fitted with the BH housing 21, the backplane fitting portion 56B can be fitted with the BH housing 21 easily. However, the backplane fitting portion 56B may not necessarily be provided. A procedure in which the cleaner housing 56 is fitted with the PH housing 31 or the BH housing 21 will be described later as a cleaning method with the cleaning tool 40.

The cleaning portion 41A is a member for cleaning the ferrule endfaces 12A, which are connecting end faces of the optical connectors 11. The cleaning portion 41A may be formed as an adhesive body for causing dust on the ferrule endfaces 12A to adhere. The adhesive body forming the cleaning portion 41A has self-adhesiveness. Here, self-adhesiveness means that the adhesive strength of the cleaning portion 41A with respect to another member is smaller than the breaking strength of the cleaning portion 41A and hence a material forming the cleaning portion 41A does not remain on the other member even when the cleaning portion 41A attached to the other member is removed. In one or more embodiments of the present invention, an adhesive face is provided on an endface of the cleaning portion 41A, the endface facing the ferrule endfaces 12A. By bringing the adhesive face into contact with the ferrule endfaces 12A, dust on the ferrule endfaces 12A is caused to adhere to the adhesive face, thereby being consequently removed. Moreover, the cleaning portion 41A is formed so that, when the cleaning portion 41A is brought into contact with and then removed from the ferrule endfaces 12A, part of the adhesive portion 41 would not remain on the ferrule endfaces 12A. However, the cleaning portion 41A may not necessarily be formed as an adhesive body as long as being a member for cleaning the ferrule endfaces 12A.

The cleaning portion 41B is a member for cleaning the ferrule endfaces 17A, which are connecting end faces of the optical connectors 16. The cleaning portion 41B may be formed as an adhesive body for causing dust on the ferrule endfaces 17A to adhere. The adhesive body forming the cleaning portion 41B has self-adhesiveness. In one or more embodiments of the present invention, an adhesive face is provided on an endface of the cleaning portion 41B, the endface facing the ferrule endfaces 17A. By bringing the adhesive face into contact with the ferrule endfaces 17A, dust on the ferrule endfaces 17A is caused to adhere to the adhesive face, thereby being consequently removed. Moreover, the cleaning portion 41B is formed so that, when the cleaning portion 41B is brought into contact with and then removed from the ferrule endfaces 17A, part of the cleaning portion 41B would not remain on the ferrule endfaces 17A. However, the cleaning portion 41B may not necessarily be formed as an adhesive body as long as being a member for cleaning the ferrule endfaces 17A. Moreover, the cleaning tool 40 may not necessarily include the cleaning portion 41B.

The adhesive body forming the cleaning portion 41A or the cleaning portion 41B is formed of a member made of silicone adhesive having self-adhesiveness, to cause dust to adhere thereto. The adhesive body may be formed, for example, by mixing adhesive into a main agent. As the main agent, polyolefin, such as polyethylene or polypropylene, copolymer including monomer, or the like can be used, for example. As the adhesive to be mixed with the main agent, natural rubber, synthetic rubber such as butyl rubber, acrylic rubber, or the like, mixture of polyvinyl chloride and plasticizer, or the like can be used for example.

The cleaning unit holding portion 57 is a member that holds the cleaning portion 41A or the cleaning portion 41B against the cleaner housing 56. The cleaning unit holding portion 57 also functions as a spacer that ensures a space in a contact direction when the cleaning portion 41A or the cleaning portion 41B contacts the ferrule endfaces 12A or the ferrule endfaces 17A. However, when the cleaning portion 41A or the cleaning portion 41B is supported directly at the cleaner housing 56, the cleaning tool 40 may not necessarily include the cleaning unit holding portion 57.

Cleaning Method

A cleaning method with the cleaning tool 40 according to one or more embodiments of the present invention will be described below.

FIG. 9A is a diagram illustrating a state of the cleaning tool 40, the backplane optical connectors 11, and printed-board optical connectors 16 before cleaning operation. An operator first prepares the cleaning tool 40. The operator then causes the printed-board fitting portion 56A of the cleaner housing 56 of the cleaning tool 40 to be fitted with the PH housing 31 of the printed-board optical connector (see a white arrow in FIG. 9A).

FIG. 9B is a diagram illustrating a state where the printed-board fitting portion 56A of the cleaner housing 56 is fitted with the PH housing 31. By causing the printed-board fitting portion 56A of the cleaning tool 40 to be fitted with the PH housing 31 of the printed-board optical connector, the cleaning tool 40 can be attached to the printed-board optical connector and can consequently be attached to the printed board 33. When the printed-board fitting portion 56A of the cleaning tool 40 is fitted with the printed-board optical connector, the cleaning portion 41A is disposed so as to face the optical connectors 11 on the side with the ferrule endfaces 12A as illustrated in FIG. 9B. When the cleaning tool 40 includes the cleaning portion 41B and the printed-board fitting portion 56A of the cleaning tool 40 is fitted with the printed-board optical connector, the cleaning face of the cleaning portion 41B contacts the plurality of printed-board optical connectors 16 on the side with the ferrule endfaces 17A collectively as illustrated in FIG. 9B (however, the cleaning tool 40 may not necessarily include the cleaning portion 41B as described above).

FIG. 9C is a diagram illustrating a state where the cleaning portion 41A contacts the ferrule endfaces 12A. By sliding the printed board 33 to be moved (see the white arrow in FIG. 9B) in a state where the cleaning tool 40 is attached to the printed-board optical connector, the cleaning face of the cleaning portion 41A contacts the plurality of backplane optical connectors 11 on the side with the ferrule endfaces 12A collectively as illustrated in FIG. 9C. Accordingly, according to one or more embodiments of the present invention, cleaning of the ferrule endfaces 12A of the plurality of optical connectors 11 can be performed collectively while the plurality of optical connectors 16 are inserted into and connected to the PH housing 31.

Note that, when the cleaning tool 40 includes the cleaning portion 41B, and the printed-board fitting portion 56A of the cleaner housing 56 is fitted with the PH housing 31, the cleaning portion 41B contacts the ferrule endfaces 17A of the plurality of optical connectors 11. Accordingly, cleaning of the ferrule endfaces 17A of the plurality of optical connectors 16 can be performed together with cleaning of the ferrule endfaces 12A of the plurality of optical connectors 11.

After the state in FIG. 9C, separation (fitting release) of the BH housing 21 and the cleaner housing 56 causes the cleaning portion 41A of the cleaning tool 40 to be removed from the ferrule endfaces 12A. At this event, the dust on the ferrule endfaces 12A is removed due to the self-adhesiveness of the cleaning portion 41A and then adheres to the cleaning portion 41A. In addition, separation (fitting release) of the cleaner housing 56 and the PH housing 31 causes the cleaning portion 41B of the cleaning tool 40 to be removed from the ferrule endfaces 17A. At this event, the dust on the ferrule endfaces 17A is removed due to the self-adhesiveness of the cleaning portion 41B and then adheres to the cleaning portion 41B. Accordingly, while the plurality of optical connectors (11, 16) are inserted and connected, cleaning of the connecting end faces (12A, 17A) of the plurality of optical connectors that are connected accordingly can be performed collectively.

The above-described cleaning tool 40 according to one or more embodiments is a cleaning tool that cleans the connecting end faces of the printed-board optical connector 30 (corresponding to a first optical connector) and the backplane optical connector 20 (corresponding to a second optical connector) to be connected to the printed-board optical connector 30. The cleaning tool 40 according to one or more embodiments includes the printed-board fitting portion 56A (corresponding to a first fitting portion) that is to be fitted with the printed-board optical connector 30 (corresponding to the first optical connector) and the cleaning portion 41A including a cleaning face that is to contact the connecting end faces 12A of the backplane optical connector 20 (corresponding to the second optical connector). Accordingly, the connecting end faces of the backplane optical connector 20 (corresponding to the second optical connector) can be cleaned in a state where the cleaning tool 40 is attached to the printed-board optical connector 30 (corresponding to the first optical connector), which can improve workability of the cleaning operation.

Moreover, according to one or more embodiments, the cleaning tool 40 further includes the cleaning portion 41B that is to contact the connecting end faces 17A of the printed-board optical connector (corresponding to the first optical connector) when the printed-board optical connector 30 (corresponding to the first optical connector) is fitted with the printed-board fitting portion 56A (corresponding to the first fitting portion). Accordingly, cleaning of the cleaning endfaces 12A of the printed-board optical connector 30 (corresponding to the first optical connector) and the cleaning endfaces 17A of the backplane optical connector 20 (corresponding to the second optical connector) can be performed collectively. However, as described above, the cleaning tool 40 may not necessarily include the cleaning portion 41B.

Moreover, the cleaning tool 40 of one or more embodiments further includes the backplane fitting portion 56B that is to be fitted with the backplane optical connector 20 (corresponding to the second optical connector). Note that, as described above, the cleaning tool 40 may not necessarily include the backplane fitting portion 56B.

The cleaning portion 41A according to one or more embodiments includes a cleaning face that can contact the plurality of cleaning endfaces 12A of the backplane optical connector 20 (corresponding to the second optical connector) collectively. This enables cleaning of the plurality of cleaning endfaces 12A all together and hence can improve workability of the cleaning operation. Note that, as will be described later, the cleaning face of the cleaning portion may be used to clean only a sole (single) cleaning endface and may not be used to necessarily clean a plurality of cleaning endfaces.

In one or more embodiments, the printed-board optical connector 30 (corresponding to the first optical connector) includes the plurality of cleaning endfaces 17A, and the backplane optical connector 20 (corresponding to the second optical connector) includes the plurality of connecting end faces 12A to be connected with the plurality of connecting end faces 17A of the printed-board optical connector 30. The cleaning tool 40 includes the cleaning portion 41B having the cleaning face that can contact the plurality of cleaning endfaces 17A of the printed-board-side connector 30 (corresponding to the first optical connector) collectively and the cleaning portion 41A having the cleaning face that can contact the plurality of cleaning endfaces 12A of the backplane optical connector 20 (corresponding to the second optical connector) collectively. This enables cleaning of the plurality of cleaning endfaces 12A and 17A all together and hence can improve workability of the cleaning operation. According to one or more embodiments of the present invention, cleaning of the connecting end faces 12A and 17A of the plurality of optical connectors 11 and 17 can be performed collectively while the plurality of optical connectors 11 and 17 are inserted and connected, which improves workability of the cleaning operation.

In one or more embodiments, by causing the printed-board fitting portion 56A (corresponding to the first fitting portion) of the cleaning tool 40 to be fitted with the printed-board optical connector 30, the cleaning tool 40 can be attached to the printed-board optical connector 30. Hence, by sliding and moving the printed board 33 (see the white arrow in FIG. 9B) in a state where the cleaning tool 40 is attached to the printed-board optical connector 30, the cleaning portion 41A can be caused to contact the connecting end faces 12A of the backplane optical connector 20 as illustrated in FIG. 9C. The connecting end faces 12A of the backplane optical connector 20 are normally disposed at a retreated position. However, according to one or more embodiments of the present invention, workability of the cleaning operation of the connecting end faces 12A of the backplane optical connector 20 can be improved.

Figure 10A:
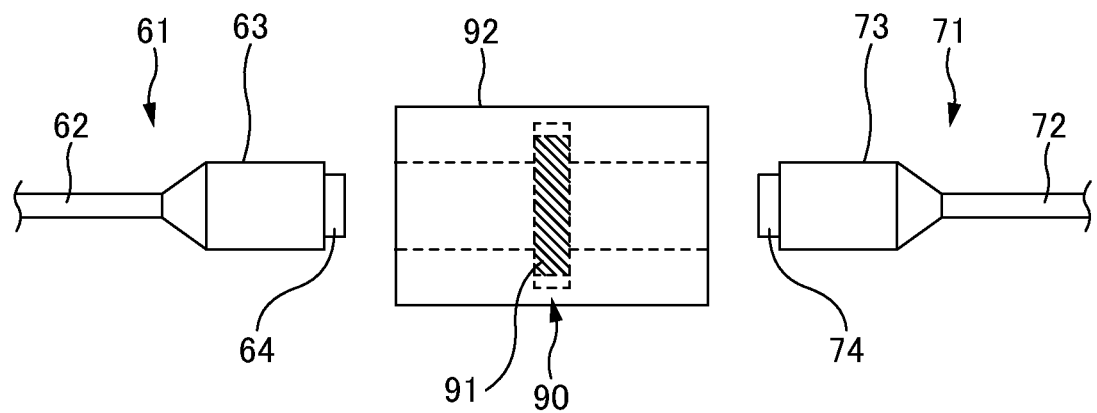
FIGS. 10A to 10C are explanatory diagrams illustrating a cleaning tool 90 according to one or more embodiments.
Figure 10B:
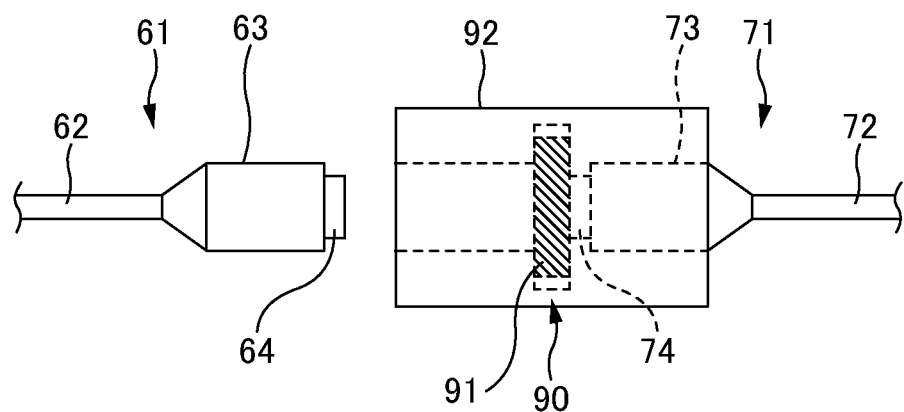
Figure 10C:
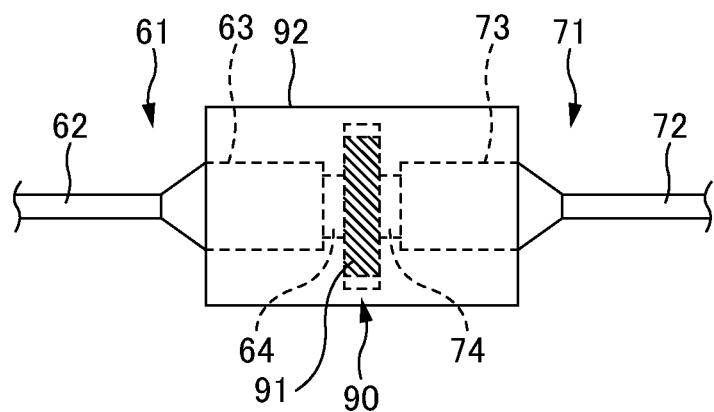

FIGS. 10A to 10C are explanatory diagrams illustrating a cleaning tool 90 according to one or more embodiments. The cleaning tool 90 according to one or more embodiments is a tool applied to, for example, an MPO optical connector (F13 type multicore optical fiber connector defined in at least one of IEC 61754-7 and JIS C 5982). An optical connector 61 and an optical connector 71 to be cleaned with the cleaning tool 90 according to one or more embodiments are MPO optical connectors and are normally connected via an adapter (not illustrated).

The optical connector 61 includes a ferrule 64 and a connector housing 63. The ferrule 64 is a member that holds an end portion of an optical fiber 62. The connector housing 63 is a member that holds the ferrule 64. The connector housing 63 is configured to be able to be coupled with the adapter (not illustrated).

The optical connector 71 includes a ferrule 74 and a connector housing 73. The ferrule 74 is a member that holds an end portion of the optical fiber 72. The connector housing 73 is a member that holds the ferrule 74. The connector housing 73 is configured to be able to be coupled with the adapter (not illustrated).

The cleaning tool 90 includes a cleaner housing 92 and a cleaning portion 91.

The cleaner housing 92 is a member that houses therein the cleaning portion 91 and is to be fitted with the connector housing 63 or the connector housing 73 at the time of cleaning. Fitting portions that are to be fitted with the connector housings 63 and 73 of the optical connectors 61 and 71 are provided at two ends of the cleaner housing 92, respectively.

The cleaning portion 91 is a member for cleaning a connecting end face of the ferrule 64 and a connecting end face of the ferrule 74. In one or more embodiments of the present invention, the cleaning portion 91 is formed of an adhesive body having self-adhesiveness. By bringing this adhesive body into contact with the connecting end face of the ferrule 64 and the connecting end face of the ferrule 74, dust on the connecting end face of the ferrule 64 and the connecting end face of the ferrule 74 is caused to adhere to the cleaning portion 91, thereby being removed. Note that, although the cleaning portion 91 is a member for cleaning the connecting end face of the ferrule 64 and connecting end face of the ferrules 74, the cleaning portion 91 may be a member for cleaning the connecting end face of either the ferrule 64 or the ferrule 74.

An operator first causes one of the fitting portions (corresponding to the first fitting portion) of the cleaning tool 90 to be fitted with one of the optical connectors 71 (corresponding to the first connector). Through this operation, the cleaning tool 90 is attached to the optical connector 71 as illustrated in FIG. 10B. In this state, the cleaning face of the cleaning portion 91 contacts the connecting end face of the ferrule 74 of the optical connector 71 as illustrated in FIG. 10B.

The operator then causes the other fitting portion of the cleaning tool 90 to be fitted with the other optical connector 61, in a state where the cleaning tool 90 is attached to the optical connector 71. Through this operation, the cleaning face of the cleaning portion 91 contacts the connecting end face of the ferrule 64 of the optical connector 61 as illustrated in FIG. 10B.

In one or more above-described embodiments, the cleaning face of the cleaning portion 91 of the cleaning tool 90 contacts the sole (single) connecting end face and does not contact the plurality of connecting end faces collectively as in one or more embodiments. Note that, also in one or more embodiments, the cleaning tool 90 includes the fitting portion (corresponding to the first fitting portion) that is to be fitted with the one optical connector 71 (corresponding to the first optical connector), and the cleaning portion 91 including the cleaning face that is to contact the connecting end face of the other optical connector 61 (corresponding to the second optical connector). Hence, the connecting end face of the other optical connector 61 can be cleaned in a state where the cleaning tool 90 is attached to the optical connector 71, which can improve workability of the cleaning operation.

Modified Example

Figure 11:
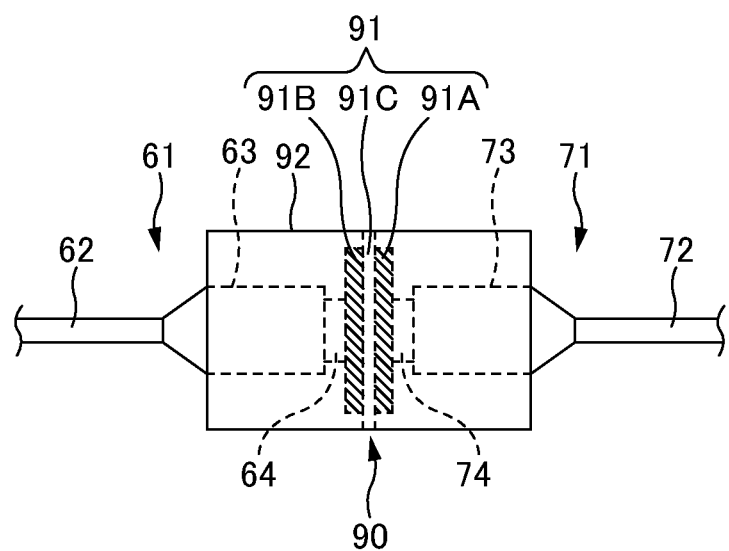
FIG. 11 is an explanatory diagram illustrating a cleaning tool 90 according to a modified example of one or more embodiments.

FIG. 11 is an explanatory diagram illustrating a cleaning tool 90 according to a modified example of one or more embodiments. A cleaning portion 91 of the cleaning tool 90 illustrated in FIG. 11 is configured such that a cleaning portion 91A and a cleaning portion 91B are provided on two respective sides of the substrate 91C. Even when the cleaning portion 91 is formed as such, the connecting end face of the ferrule 64 of the optical connector 61 and the connecting end face of the ferrule 74 of the optical connector 71 can be cleaned.

Figure 19A:
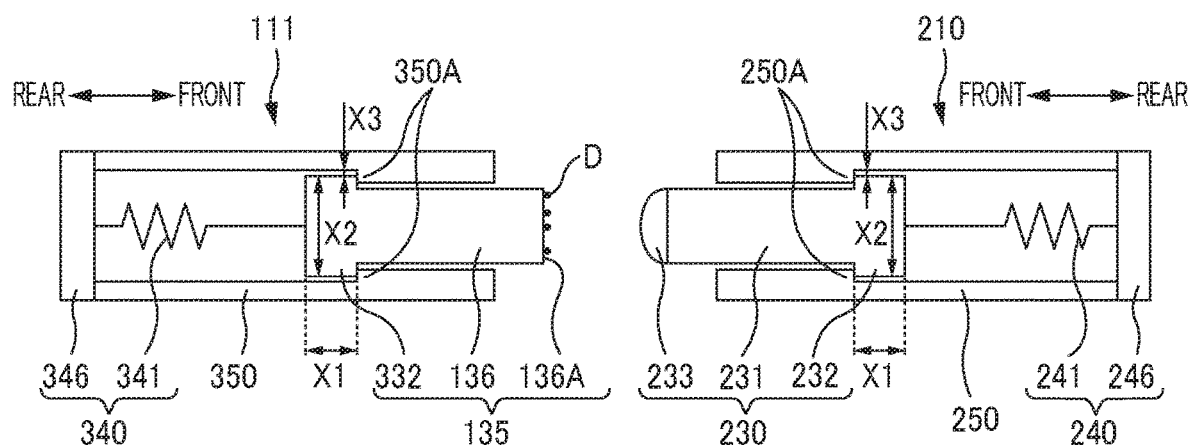
FIGS. 19A to 19C are explanatory diagrams illustrating a cleaning procedure for a ferrule endface 136A of an optical connector 111 using a cleaning tool 210 according to a comparative example.
Figure 19B:
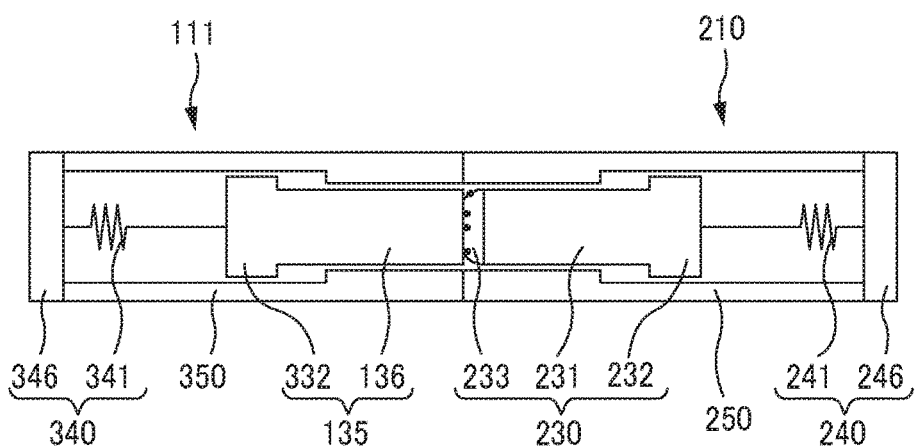
Figure 19C:
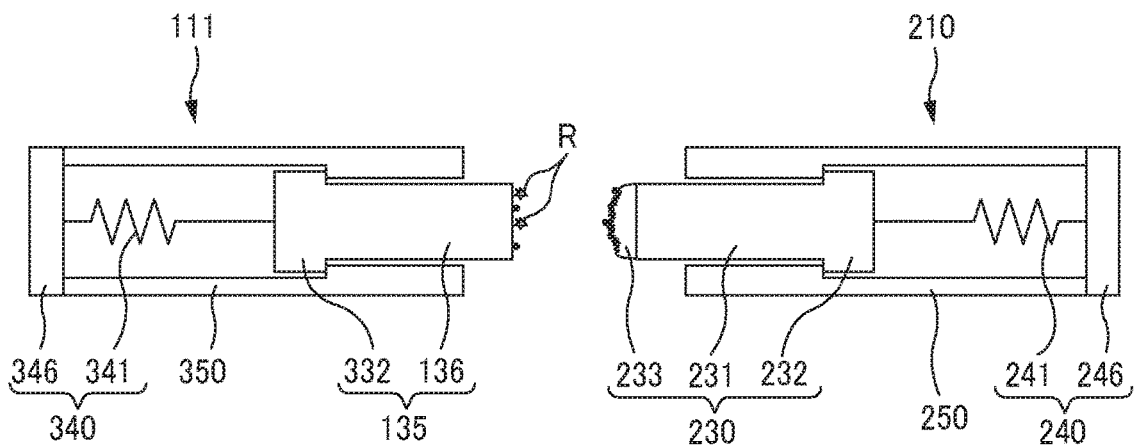

Before a cleaning tool according to one or more embodiments of the present invention is described, a structure of a cleaning-target optical connector and a cleaning tool according to a comparative example will be described first as illustrated in FIGS. 19A to 19C.

Structure of Cleaning-Target Optical Connector

FIGS. 19A to 19C are explanatory diagrams illustrating a procedure of cleaning a ferrule endface 136A of an optical connector 111 using a cleaning tool 210 according to a comparative example. On the left side in the drawings, a structure of the cleaning-target optical connector is also illustrated. On the right side in the drawings, a structure of the cleaning tool 210 according to the comparative example is illustrated. In the following description, a "front-rear direction" is defined in a direction of attaching/detaching the optical connector 111 and the cleaning tool 210 as illustrated in FIG. 19A. The side opposing the one to be attached/detached (the cleaning tool 210 side in the case of the optical connector 111, and the optical connector 111 side in the case of the cleaning tool 210) is assumed as the "front", and the opposite side is defined as the "rear". Note that, in the optical connector 111 illustrated in FIGS. 19A to 19C, illustration of optical fibers is omitted.

The optical connector 111 is provided to an end portion of an optical fiber and is a connecting component for optically connecting the optical fibers to each other. For example, the optical connector 111 is an optical connector constituted by incorporating an MT type optical connector (e.g., a Multi-fiber Push On (MPO) optical connector defined in at least one of IEC 61754-7 and JIS C 5982, and the like). The optical connector 111 includes a ferrule 135, a floating mechanism 340, and an optical connector housing 350.

The ferrule 135 is a member that holds the end portion of the optical fiber. The ferrule 135 is, for example, a Mechanically Transferable (MT) optical connector (optical connector defined in at least one of IEC 61754-5 and JIS C 5981). The ferrule 135 includes a ferrule body part 136 and a ferrule flange part 332. A front endface of the ferrule body part 136 serves as a ferrule endface 136A, which is a connecting end face when optical connectors 111 are connected to each other. The ferrule flange part 332 is a flange part protruding outward from an outer periphery of the ferrule body part 136. The ferrule flange part 332 comes into contact with a housing protrusion 350A of the optical connector housing 350, which prevents the ferrule 135 pressed forward by a floating mechanism 340 to be described later from falling off forward.

In a case that the ferrule 135 is, for example, an MT type optical connector, the dimensions of the ferrule flange part are defined in at least one of IEC 61754-5 and JIS C 5981 mentioned above. Specifically, as the dimensions of the ferrule flange part 332 illustrated in FIG. 19A, a front-rear length X1 is assumed as 2±0.1 mm, while a width X2 is assumed as 7 mm (referred to sometimes as a long side, below). Note that the length of a side perpendicular to the front-rear direction and a direction of the width X2 is assumed as 3±0.1 mm (referred to sometimes as a short side, below).

The floating mechanism 340 is a mechanism for urging the ferrule 135 forward and housing the ferrule 135 in the optical connector housing 350 so that the ferrule 135 can retreat. The floating mechanism 340 includes a coil spring 341 and an engaging member 346 (spring push).

The coil spring 341 is disposed in a state of being compressed between a clamp (not illustrated, e.g., a pin clamp) provided in the rear of the ferrule flange part 332 and the engaging member 346. The repulsive force of the compressed coil spring 341 urges the ferrule 135 forward via the clamp. The ferrule 135 can be pressed rearward against the urging force of the coil spring 341. The engaging member 346 is a member for housing the coil spring 341 in a compressed state, in the optical connector housing 350.

The optical connector housing 350 is a member that holds the ferrule 135. To allow a movement in the front-rear direction of the ferrule 135 with respect to the optical connector housing 350, a gap X3 is formed between the ferrule flange part 332 and the optical connector housing 350. Note that the optical connector housing 350 may be configured so as to be able to be coupled with an unillustrated adapter.

Regarding Cleaning Tool 210 According to Comparative Example

Next, a cleaning tool according to a comparative example will be described with reference to FIGS. 19A to 19C.

The cleaning tool 210 is a tool for cleaning the ferrule endface 136A of the optical connector 111. The cleaning tool 210 includes a cleaning tool 230, a floating mechanism 240, and a housing 250. Note that the cleaning tool 210 has a structure in which the cleaning tool 230, instead of the ferrule 135, is housed in the optical connector 111. Hence, the cleaning tool 230 is urged forward by a floating mechanism 240 having the same structure as that of the floating mechanism 340 and is housed in a housing 250 (cleaning tool housing) having the same shape as that of the optical connector housing 350, so as to be able to retreat.

The cleaning tool 230 is a member for cleaning a ferrule endface 136A. The cleaning tool 230 includes an adhesive member 233, a body part 231, and a flange part 232. The adhesive member 233 is a member for causing dust on the ferrule endface 136A to adhere to the member. The adhesive member 233 is formed of a member having self-adhesiveness to cause dust to adhere to itself. Here, self-adhesiveness means that the adhesive strength of the adhesive member 233 with respect to another member is smaller than the breaking strength of the adhesive member 233 and hence a material forming the adhesive member 233 does not remain on the other member even when the adhesive member 233 brought in contact with the other member is removed. In the present comparative example, an adhesive face is provided on an endface of the adhesive member 233, the adhesive face facing the ferrule endface 136A. By bringing the adhesive face into contact with the ferrule endface 136A, dust on the ferrule endface 136A is caused to adhere to the adhesive face.

To cause dust to adhere to the adhesive face, the adhesive member 233 is formed of a member made of silicone adhesive having self-adhesiveness. The adhesive member 233 may be formed, for example, by mixing adhesive into a main agent. As the main agent, polyolefin, such as polyethylene, polypropylene or the like, copolymer including monomer, or the like can be used, for example. As the adhesive to be mixed with the main agent, natural rubber, synthetic rubber such as butyl rubber, acrylic rubber or the like, or mixture of polyvinyl chloride and plasticizer, or the like can be used for example.

The body part 231 is a member that holds the adhesive member 233. In the present comparative example, the adhesive member 233 is provided on the front end surface of the body part 231. The flange part 232 is a flange protruding outward from an outer periphery of the body part 231. The flange part 232 comes into contact with a housing protrusion 250A of the housing 250, thereby preventing the cleaning tool 230 pressed forward by the floating mechanism 240 from falling off forward.

The flange part 232 according to the present comparative example is formed in similar dimensions to those of the ferrule flange part 332 defined in JIS C 5981 described above. Specifically, the flange part 232 has a length X1 in the front-rear direction of 2±0.1 mm, and a width X2 of 7 mm at long side and 3±0.1 mm at a short side. The flange part 232 according to the comparative example is thus formed in similar dimensions to those of the ferrule flange part 332. Hence, a gap X3 is formed between the flange part 232 and the housing 250 as the gap X3 between the ferrule flange part 332 and the optical connector housing 350. Hence, in the present comparative example, the cleaning tool 230 is movable in front-rear directions with respect to the housing 250 when the ferrule 135 and the cleaning tool 230 are brought in contact with each other. Since the gap X3 is formed between the flange part 232 and the housing 250, the cleaning tool 230 sometimes moves in directions perpendicular to the front-rear directions with respect to the housing 250.

Next, a cleaning procedure with the cleaning tool 210 according to the comparative example will be described. Here, it is assumed that dust D adheres to the ferrule endface 136A of the optical connector 111.

As illustrated in FIG. 19A, first, an operator prepares the cleaning tool 210. Here, as illustrated above, the dimensions (X1, X2, and X3) of the flange part 232 and the like of the cleaning tool 210 are the same as the dimensions (X1, X2, and X3) of the ferrule flange part 332 and the like of the optical connector 111, respectively. Moreover, the cleaning tool 210 is disposed so that the adhesive member 233 of the cleaning tool 210 faces the ferrule endface 136A of the optical connector 111.

The operator then brings the adhesive member 233 into contact with the ferrule endface 136A as illustrated in FIG. 19B. The contact of the adhesive member 233 into the ferrule endface 136A may be made by coupling the optical connector 111 (optical connector housing 350) and the cleaning tool 210 (housing 250) with an unillustrated adapter. This causes the dust D on the ferrule endface 136A to adhere to the adhesive member 233.

When the ferrule endface 136A of the optical connector 111 to which the dust D adheres is cleaned by using the cleaning tool 210 according to the comparative example, a residue of the adhesive member 233 sometimes adheres to the ferrule endface 136A as illustrated in FIG. 19C. In particular, in a case that the dust D is a hard material, such as sand, it is noticeable that the residue of the adhesive member 233 adheres to the ferrule endface 136A. A cause of this phenomenon is considered as follows. When the cleaning tool 230 is caused to retreat by the floating mechanism 240 at the time of cleaning, a surface of the adhesive member 233 moves in directions perpendicular to the front-rear direction with respect to the dust D due to the gap X3 between the flange part 232 and the housing 250. Consequently, the adhesive member 233 receives a shear force, which tears the adhesive member 233 off into small pieces. Note that, if a residue of the adhesive member 233 adheres to the ferrule endface 136A, an increase in loss of optical signals may occur.

Structure of Cleaning Tool According to One or More Embodiments

Next, a cleaning tool according to one or more embodiments of the present invention will be described.

Figure 13A:
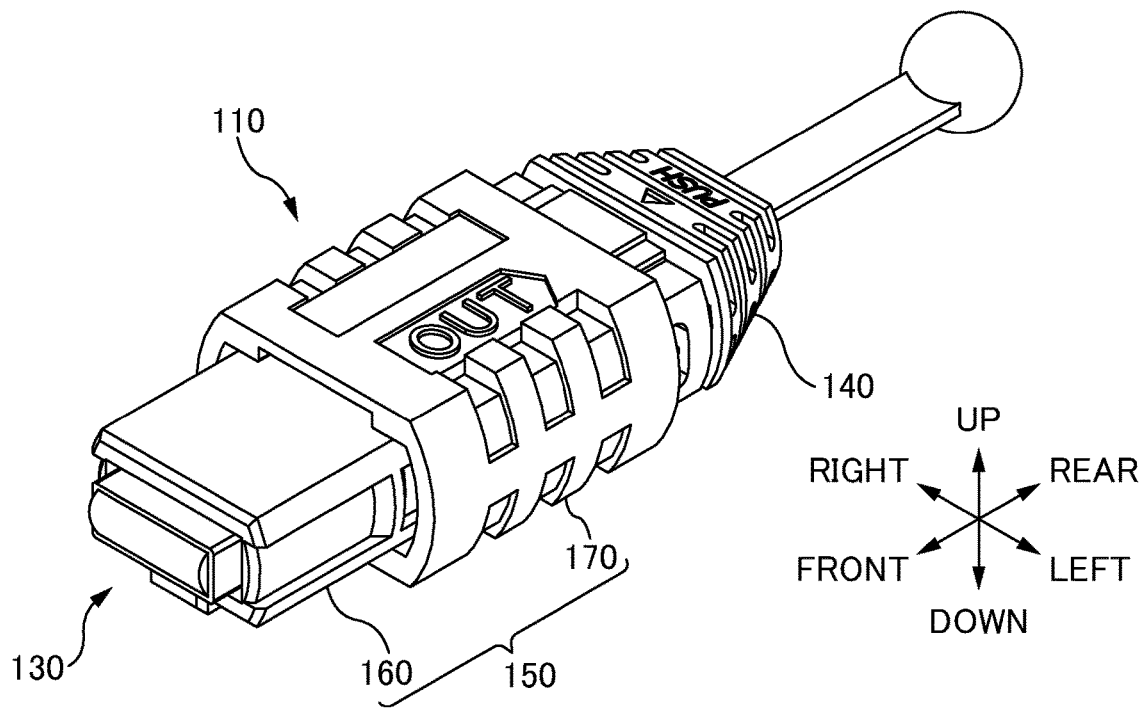
FIG. 13A is a perspective view of a cleaning tool 110 according to one or more embodiments.
Figure 13B:
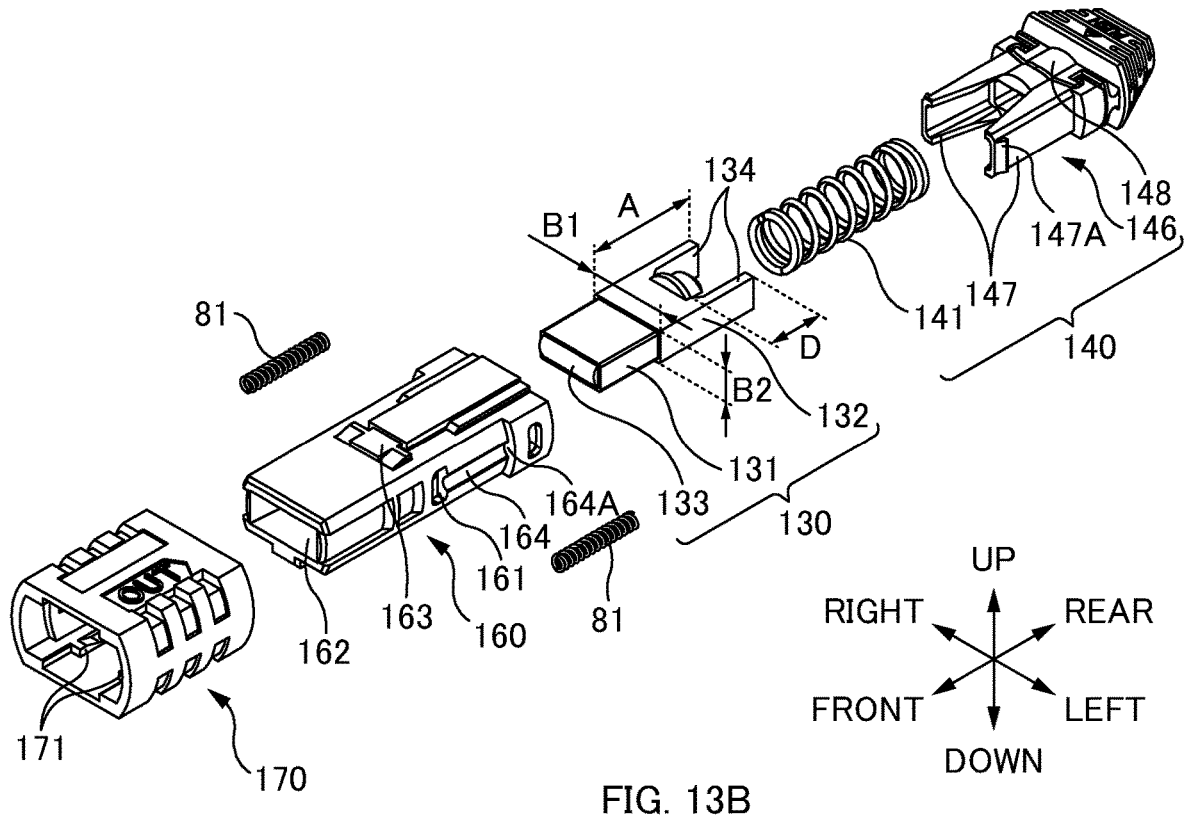
FIG. 13B is an exploded perspective view of the cleaning tool 110 according to one or more embodiments.

FIG. 13A is a perspective view of a cleaning tool 110 according to one or more embodiments. FIG. 13B is an exploded perspective view of the cleaning tool 110 according to one or more embodiments. In the following, a description will be given of a structure of the cleaning tool 110 according to one or more embodiments of the present invention, and subsequently, a procedure for cleaning a ferrule endface 136A of the optical connector 111 using the cleaning tool 110 according to one or more embodiments of the present invention will be described.

In the following description, directions will be defined as illustrated in FIGS. 13A and 13B. Specifically, a "front-rear direction" is defined in a contact direction in which the cleaning tool 110 comes in contact with the ferrule endface 136A of the optical connector 111, and the adhesive member 133 side (the ferrule endface 136A side in another optical connector 111) is assumed as the "front" while the opposite side is assumed as the "rear". Note that the "front-rear direction" may be defined as a direction of attaching/detaching the optical connector 111 and the cleaning tool 110. Hence, the "front-rear direction" may be sometimes referred to as the "attaching/detaching direction". Moreover, a "left-right direction" is defined in a long-side direction of a rectangular endface of the cleaning tool 130, and the right side when viewed from the rear toward the front is assumed as the "right", while the other side is assumed as the "left". Moreover, a direction perpendicular to the front-rear direction and the left-right direction is assumed as an "up-down direction".

The cleaning tool 110 is a tool for cleaning the ferrule endface 136A of the optical connector 111. The cleaning tool 110 includes a cleaning tool 130, a floating mechanism 140, and a housing 150. Note that the cleaning tool 110 has a structure in which the cleaning tool 130, instead of the ferrule 135, is housed in the optical connector 111. Hence, the cleaning tool 130 is urged forward by the floating mechanism 140 having the same structure as that of the floating mechanism 340 and is housed in the housing 150 having the same shape as that of the optical connector housing 350 so as to be able to retreat.

The cleaning tool 130 is a member for cleaning a ferrule endface 136A. The cleaning tool 130 includes an adhesive member 133, a body part 131, and a flange part 132. The adhesive member 133 is a member for causing dust on the ferrule endface 136A to adhere to the member. The adhesive member 133 is formed of a member having self-adhesiveness to cause dust to adhere to itself. In one or more embodiments of the present invention, an adhesive face is provided on an endface of the adhesive member 133, the endface facing the ferrule endface 136A. By bringing the adhesive face into contact with the ferrule endface 136A, dust on the ferrule endface 136A is caused to adhere to the adhesive face, thereby being consequently removed. Moreover, the adhesive member 133 is configured such that, when the adhesive member 133 is brought into contact with and then removed from the ferrule endface 136A, part of the adhesive member 133 would not remain on the ferrule endface 136A. The material of the adhesive member 133 may be a material similar to that of the adhesive member 233 according to the comparative example.

The adhesive member 133 may be replaceable after being used for cleaning. At the time of replacing the adhesive member 133, only the adhesive member 133 may be replaced, or an unillustrated frame part may be attached to the body part 131 and the adhesive member 133 provided to the frame part may be replaced with the entire frame part. Note that the adhesive member 133 may be replaced as the entire cleaning tool 130 instead of being replaced as a in a single adhesive member 133.

The body part 131 is a member that holds the adhesive member 133. In one or more embodiments of the present invention, the adhesive member 133 is provided on the front end surface of the body part 131. The flange part 132 is a flange part protruding outward from an outer periphery of the body part 231. The flange part 132 comes into contact with a housing protrusion 150A of a housing 150 (see FIG. 14A), thereby preventing the cleaning tool 130 pressed forward by the floating mechanism 140 from falling off forward.

The flange part 132 according to one or more embodiments of the present invention is formed in dimensions modified from the dimensions of the ferrule flange part 332 defined in at least one of IEC 61754-5 and JIS C 5981 described above. The dimensions of the flange part 132 will be described later.

The floating mechanism 140 includes a coil spring 141 and an engaging member 146 (spring push). The coil spring 141 is disposed in a state of being compressed between a clamp provided in the rear of the flange part 132 and the engaging member 146. The repulsive force of the compressed coil spring 141 urges the cleaning tool 130 forward via the clamp. The cleaning tool 130 can be pressed rearward against the urging force of the coil spring 141.

The engaging member 146 is a member for housing the coil spring 141 in a compressed state, in the housing 150. The engaging member 146 is a U-shaped member including a receiving portion 148 and a pair of arm parts 147 extending forward from the left and right sides of the receiving portion 148. A rear end of the coil spring 141 is in contact with the receiving portion 148. The coil spring 141 is housed in a space between the pair of arm parts 147. At a front end of one or each of the arm parts 147, a claw part 147A is formed outward. The claw part 147A is caught on a window part 161 in side faces of the housing 150 (inner housing 160), thereby engaging the engaging member 146 with the housing 150 (inner housing 160) while receiving the repulsive force of the coil spring 141.

The housing 150 is a member that holds the cleaning tool 130. The housing 150 includes the inner housing 160, an outer housing 170, and coupling springs 81. The inner housing 160 and the outer housing 170 hold the cleaning tool 130. The inner housing 160 is a tubular member extending in the front-rear direction and houses therein the cleaning tool 130. The outer housing 170 is a tubular member extending in the front-rear direction and houses therein the inner housing 160. The inner housing 160 and the outer housing 170 are fixed by the engaging portion 163 provided to the inner housing 160 being engaged with an engaging target portion 171 provided to the outer housing 170.

Each of the coupling springs 81 is disposed so as to be sandwiched between a groove part 164 provided in an outer face of the inner housing 160 and a groove part (not illustrated) provided in an inner face of the outer housing 170. Moreover, each of the coupling springs 81 is disposed in a state of being compressed between a spring receiver 164A in the groove part 164 of the inner housing 160 and a spring receiver (not illustrated) in a groove part of the outer housing 170. Accordingly, the outer housing 170 is urged forward with respect to the inner housing 160.

Figure 14A:
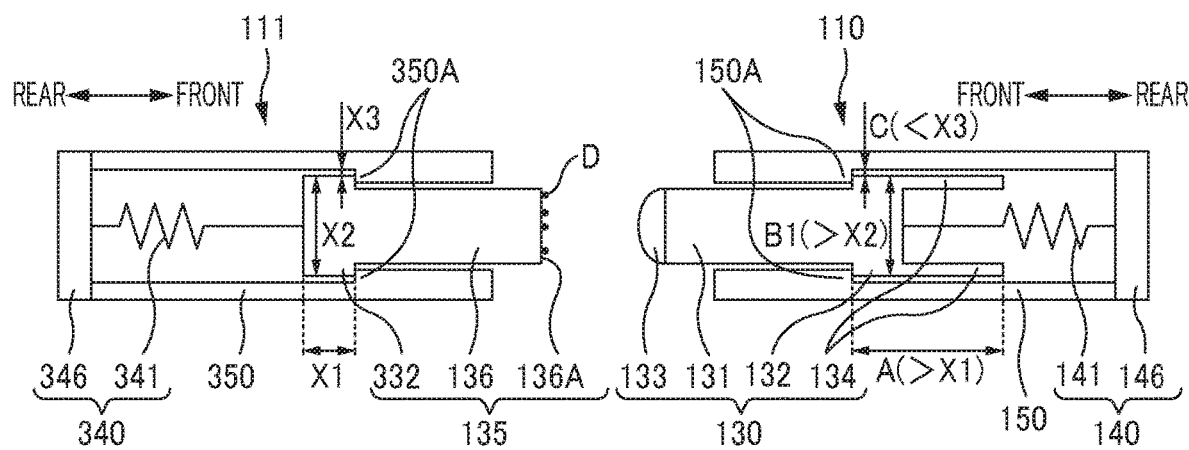
FIGS. 14A to 14C are explanatory diagrams illustrating a cleaning procedure for a ferrule endface 136A of an optical connector 111 using the cleaning tool 110 according to one or more embodiments.
Figure 14B:
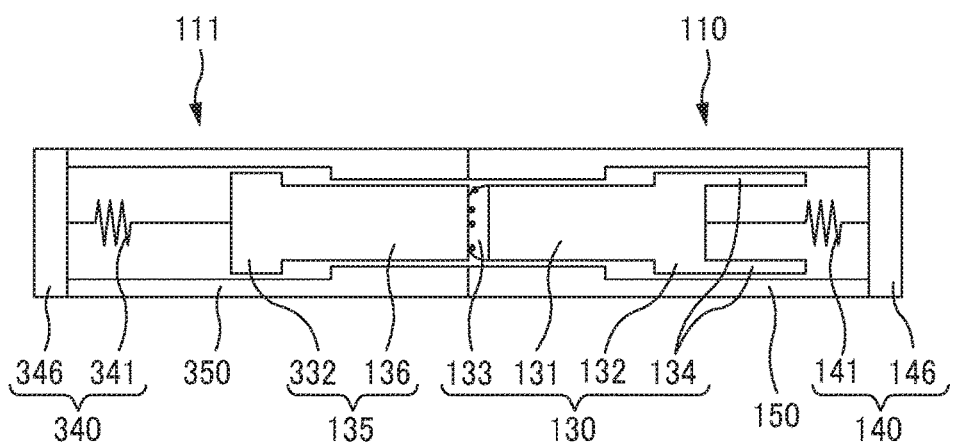
Figure 14C:
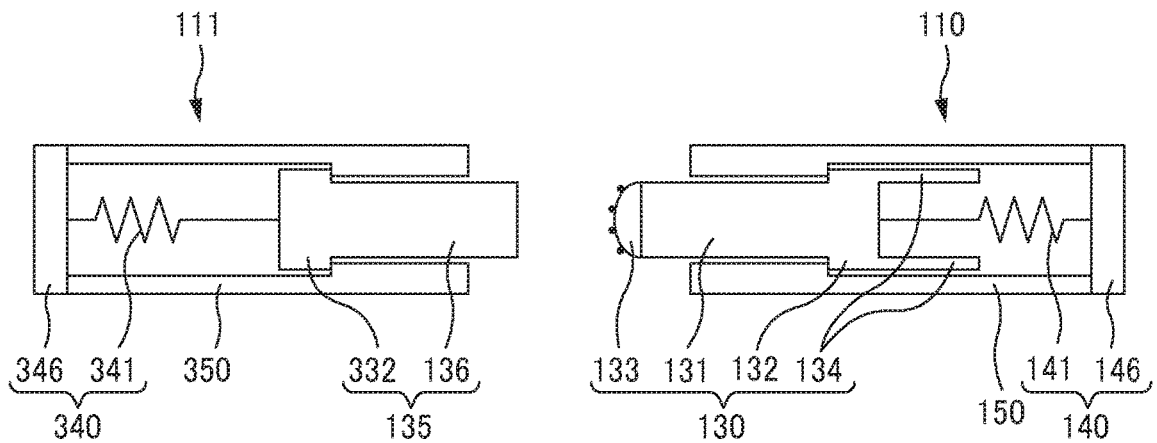

Cleaning Procedure with Cleaning Tool According to One or More Embodiments:

FIGS. 14A to 14C are explanatory diagrams illustrating a procedure for cleaning the ferrule endface 136A of the optical connector 111 using the cleaning tool 110 according to one or more embodiments. In the following, a description will be mainly given of differences from the above-described cleaning procedure using the cleaning tool 210 according to the comparative example.

First, as illustrated in FIG. 13B and FIG. 14A, the dimensions (A, B1, B2, and C) of the flange part 132 and the like of the cleaning tool 110 prepared by an operator are different from the dimensions (X1, long-side X2, short-side X2, and X3) of the ferrule flange part 332 and the like of the optical connector 111. Specifically, (1) a length A in the front-rear direction of the flange part 132 is greater than a length X1 in the front-rear direction of the ferrule flange part 332 (A>X1). (2) A long-side B1 of the flange part 132 is longer than a long side of the ferrule flange part 332 (B1>long-side X2). (3) A short-side B2 of the flange part 132 is longer than a short side of the ferrule flange part 332 (B2>short-side X2). (4) A gap C between the flange part 132 and the housing 150 is smaller than the gap X3 between the ferrule flange part 332 and the optical connector housing 350 (C<X3).

In one or more embodiments of the present invention, (1) the length A in the front-rear direction of the flange part 132 is greater than the length X1 in the front-rear direction of the ferrule flange part 332 (A>X1). Accordingly, when the cleaning tool 130 retreats with respect to the housing 150 at the time of cleaning, the cleaning tool 130 can be suppressed from being displaced in a direction of rotation about an axis in a direction perpendicular to the front-rear direction (up-down direction or left-right direction) with respect to the housing 150. Hence, the surface of the adhesive member 133 can be suppressed from moving in the directions perpendicular to the front-rear direction with respect to the dust D, and consequently, production of a residue of the adhesive member 133 can be suppressed.

Moreover, in one or more embodiments of the present invention, (2) the long-side B1 of the flange part 132 is longer than a long side of the ferrule flange part 332 (B1>long-side X2). Accordingly, when the cleaning tool 130 retreats with respect to the housing 150 at the time of cleaning, the cleaning tool 130 can be suppressed from being displaced in directions (left-right directions, here) perpendicular to the front-rear direction with respect to the housing 150, or can be suppressed from being displaced in a direction of rotation about an axis in a direction (up-down directions) perpendicular to the front-rear direction with respect to the housing 150. Hence, the surface of the adhesive member 133 can be suppressed from moving in the directions perpendicular to the front-rear direction with respect to the dust D, and consequently, production of a residue of the adhesive member 133 can be suppressed.

Moreover, in one or more embodiments of the present invention, (3) the short-side B2 of the flange part 132 is longer than a short side of the ferrule flange part 332 (B2>short-side X2). Accordingly, when the cleaning tool 130 retreats with respect to the housing 150 at the time of cleaning, the cleaning tool 130 can be suppressed from being displaced in directions (up-down directions, here) perpendicular to the front-rear direction with respect to the housing 150, or can be suppressed from being displaced in a direction of rotation about an axis in a direction (left-right directions) perpendicular to the front-rear direction with respect to the housing 150. Hence, the surface of the adhesive member 133 can be suppressed from moving in the directions perpendicular to the front-rear direction with respect to the dust D, and consequently, production of a residue of the adhesive member 133 can be suppressed.

Moreover, in one or more embodiments of the present invention, (4) the gap C between the flange part 132 and the housing 150 is smaller than the gap X3 between the ferrule flange part 332 and the optical connector housing 350 (C<X3). Accordingly, when the cleaning tool 130 retreats with respect to the housing 150 at the time of cleaning, the cleaning tool 130 can be suppressed from being displaced in directions perpendicular to the front-rear direction with respect to the housing 150. Note that when either a relationship in which (2) the long side B1 of the flange part 132 is longer than the long side of the ferrule flange part 332 (B1>long-side X2) or a relationship in which (3) the short-side B2 of the flange part 132 is greater than the short side of the ferrule flange part 332 (B2>short-side X2) is satisfied, (4) the gap C between the flange part 132 and the housing 150 is smaller than the gap X3 between the ferrule flange part 332 and the optical connector housing 350 (C<X3).

Note that not all the size relationships (1) to (4) above are necessary as long as only any one of (1) to (4) is satisfied. For example, when (1) the length A in the front-rear direction of the flange part 132 is greater than the length X1 in the front-rear direction of the ferrule flange part 332, other size relationships (2) to (4) may not necessarily be satisfied. Accordingly, when the ferrule 135 and the cleaning tool 130 are brought into contact with each other, the surface of the adhesive member 133 can be suppressed from moving in the directions perpendicular to the front-rear direction with respect to the dust D.

As illustrated in FIG. 13B, a recessed part for housing at least part of the coil spring 141 is provided in the rear of the flange part 132. On both the sides of the recessed part, protrusions 134 protruding rearward are provided. Accordingly, it is possible to secure such dimensions that the length A in the front-rear direction of the flange part 132 is greater than the length X1 in the front-rear direction of the ferrule flange part 332 (A>X1) and to set the position at which the coil spring 141 abuts on the flange part 132 at the same position at which the coil spring 341 abuts on the ferrule flange part 332 of the connector 110. Accordingly, even when the cleaning tool 110 is configured by substituting the cleaning tool 130 for the ferrule 135 of the optical connector 111, the coil spring 141 is prevented from being compressed more than needs.

According to one or more above-described embodiments, when the ferrule 135 and the cleaning tool 130 are brought in contact with each other (see FIG. 14B), the surface of the adhesive body 33 can be suppressed from moving in the directions perpendicular to the front-rear direction. In other words, the adhesive member 133 can be suppressed from being displaced in the directions perpendicular to the front-rear direction with respect to the ferrule endface 136A.

Accordingly, it is possible to suppress a shear force from being applied onto the surface of the adhesive member 133 and suppress the adhesive member 133 from being torn off into small pieces due to the dust D. As a result of this, cleaning of the ferrule endface 136A can be performed reliably (see FIG. 14C) and an increase in loss of optical signals can be suppressed.

Relationship Between Length of Protrusions and Rate of Cleaning Success

Figure 15:
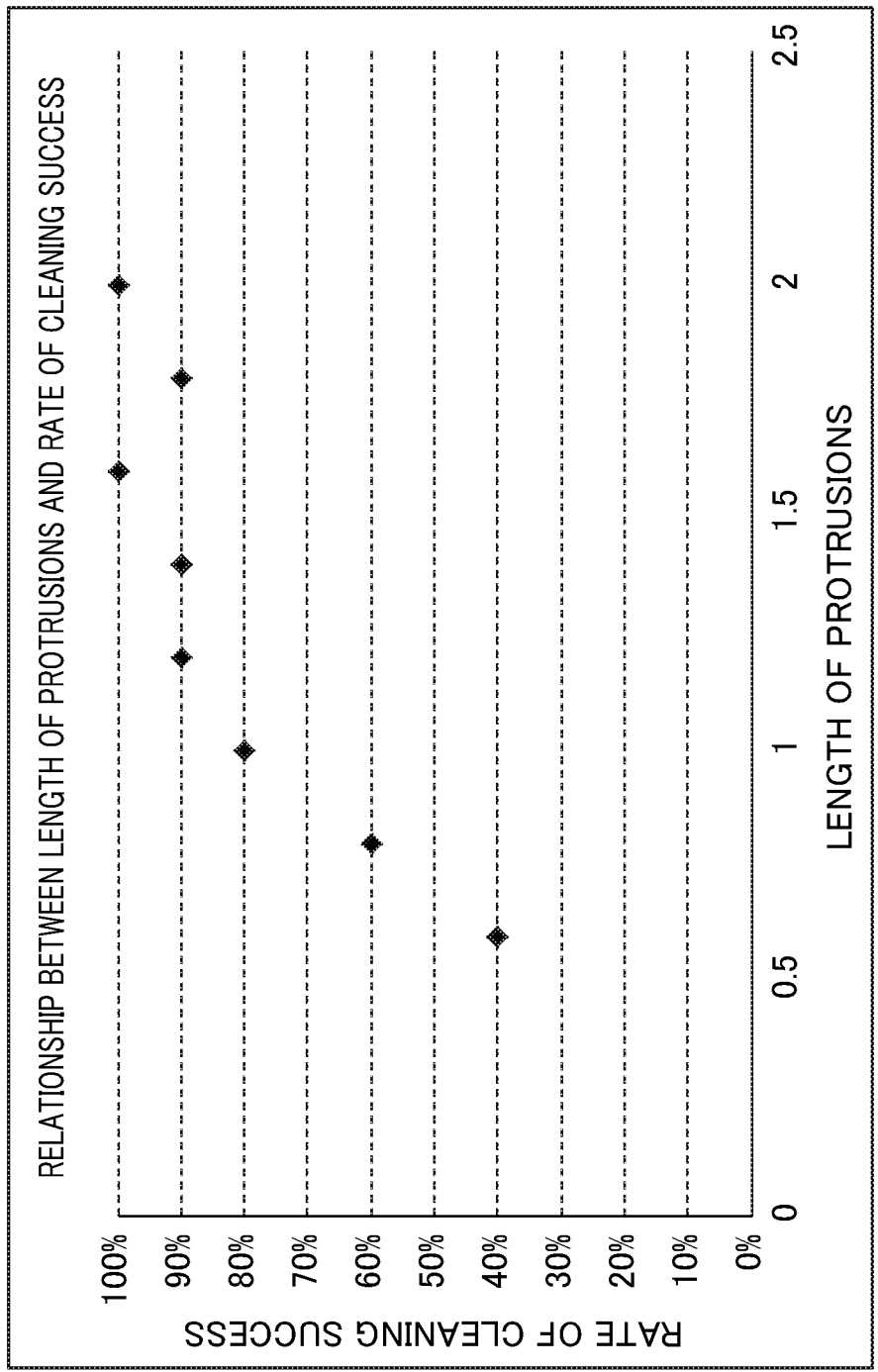
FIG. 15 is a graph illustrating a relationship between the length of protrusions and the rate of cleaning success with respect to the cleaning tool 110 according to one or more embodiments.

FIG. 15 is a graph illustrating a relationship between length of protrusions and a rate of cleaning success with respect to the cleaning tool 110 according to one or more embodiments. Here, the length of protrusions is the length in the front-rear direction of the protrusions from a position on which the coil spring abuts, and is the length D in the case of the protrusions 134 illustrated in FIG. 13B. Cleaning success means that no dust and no residue of the adhesive body adheres to the cleaning-target ferrule endface, and the ratio of cleaning success expressed in percentage is used as the rate of cleaning success. As illustrated in FIG. 15, the rate of cleaning success increases as the length of the protrusions is greater. When the length of the protrusions is 1 mm or greater, the rate of cleaning success is 80% or higher. Hence, the length D of the protrusions 134 may be 1 mm or greater.

Figure 16:
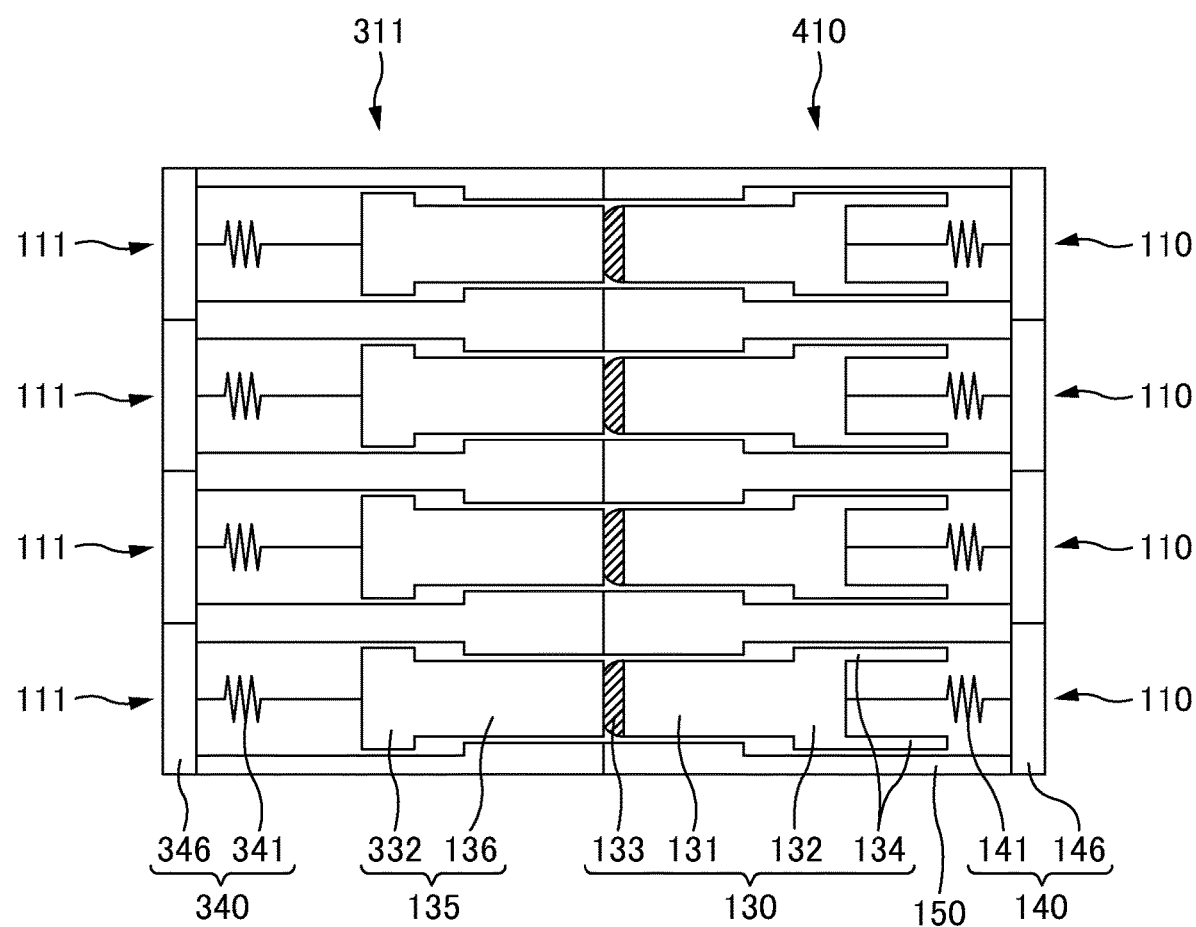
FIG. 16 is an explanatory diagram illustrating a state where a cleaning tool 410 according to one or more embodiments contacts an optical connector 311.

FIG. 16 is an explanatory diagram illustrating a state where a cleaning tool 410 according to one or more embodiments is in contact with an optical connector 311. The optical connector 311 includes a plurality of optical connectors 111. In FIG. 16, the optical connector 311 includes four optical connectors 111. Note that the optical connector 311 is not limited to this as long as including a plurality of optical connectors. The cleaning tool 410 includes the plurality of cleaning tools 110 so as to correspond to the respective optical connectors 111 of the optical connector 311. In FIG. 16, the cleaning tool 410 includes four cleaning tools 110.

Also in one or more embodiments of the present invention, the dimensions (A, B1, B2, and C) of a flange part 132 and the like of the cleaning tool 110 are different from the dimensions (X1, long-side X2, short-side X2, and X3) of a ferrule flange part 332 and the like of the optical connector 111. Specifically, (1) a length A in the front-rear direction of the flange part 132 is greater than a length X1 in the front-rear direction of the ferrule flange part 332 (A>X1). (2) A long-side B1 of the flange part 132 is longer than a long side of the ferrule flange part 332 (B1>long-side X2). (3) A short-side B2 of the flange part 132 is longer than a short side of the ferrule flange part 332 (B2>short-side X2). (4) A gap C between the flange part 132 and a housing 150 is smaller than a gap X3 between the ferrule flange part 332 and an optical connector housing 350 (C<X3). Accordingly, the adhesive member 133 is suppressed from being torn off into small pieces, thereby being able to perform cleaning of the ferrule endfaces 136A, so that an increase in loss of optical signals can be suppressed.

Figure 17:
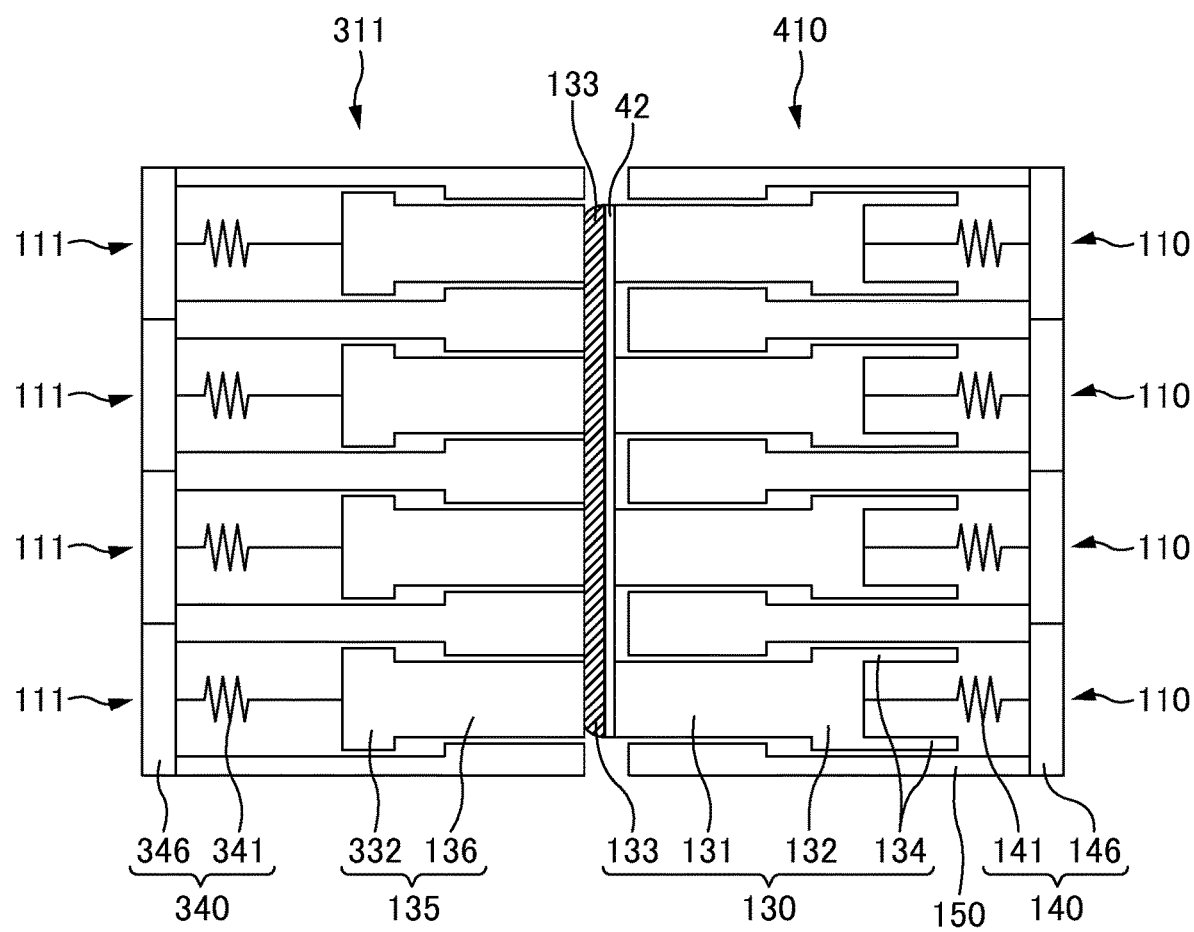
FIG. 17 is an explanatory diagram illustrating a state where a cleaning tool 410 according to one or more embodiments contacts the optical connector 311.

FIG. 17 is an explanatory diagram illustrating a state where a cleaning tool 410 according to one or more embodiments contacts an optical connector 311. The cleaning tool 410 according to one or more embodiments of the present invention includes a plurality of cleaning tools 110 so as to correspond to a plurality of respective optical connectors 111 as in one or more above-described embodiments. Each of the plurality of cleaning tools 110 is housed in a housing 150 having the same shape as that of an optical connector housing 350 of each of the optical connectors 111, so as to be able to retreat. However, the adhesive member 133 of the cleaning tool 410 according to one or more embodiments of the present invention is integrally formed to come in contact with the ferrule endfaces of the plurality of optical connectors 111 collectively. Accordingly, also in the cleaning tool 410 according to one or more embodiments of the present invention, the adhesive portion for cleaning that comes into contact with the connecting end faces of the plurality of optical connectors collectively can be replaced easily. Note that, as illustrated in FIG. 17, the cleaning tool 410 according to one or more embodiments of the present invention includes a base portion 42 that holds the adhesive member 133. However, the cleaning tool 410 may not necessarily include the base portion 42.

Pin Escape Portions

Figure 18A:
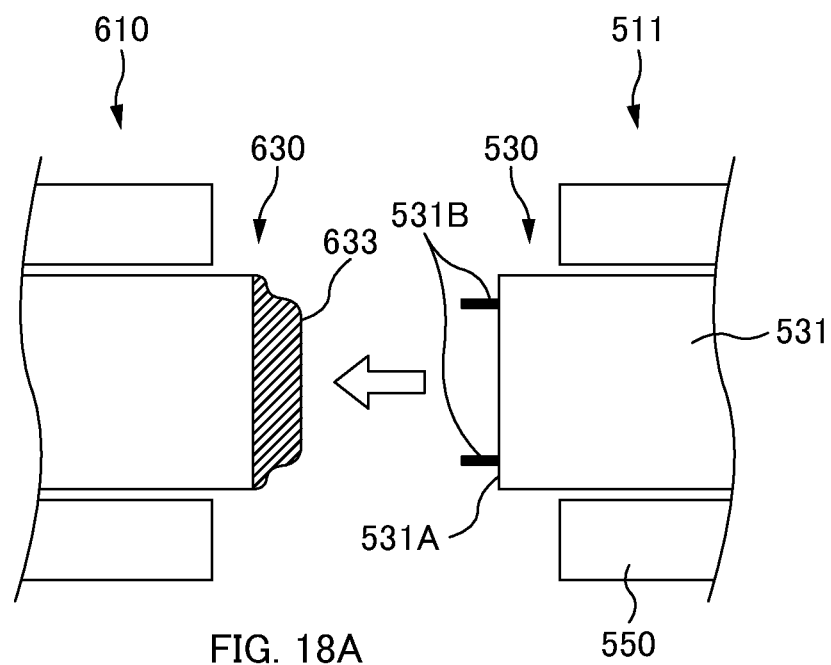
FIG. 18A is an explanatory diagram illustrating a state before a cleaning tool 610 according to one or more embodiments contacts an optical connector 511.
Figure 18B:
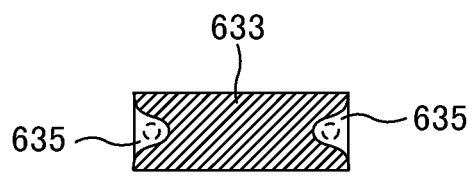
FIG. 18B is a front view of an adhesive member 633 of the cleaning tool 610 according to one or more embodiments.
Figure 18C:
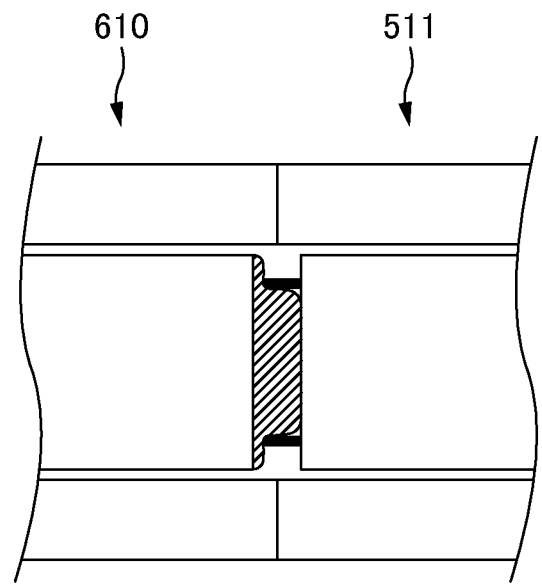
FIG. 18C is an explanatory diagram illustrating a state where the cleaning tool 610 according to one or more embodiments has contacted the optical connector 511.

FIG. 18A is an explanatory diagram illustrating a state before a cleaning tool 610 according to one or more embodiments comes in contact with an optical connector 511. FIG. 18B is a front view of an adhesive member 633 of the cleaning tool 610 according to one or more embodiments. FIG. 18C is an explanatory diagram illustrating a state where the cleaning tool 610 according to one or more embodiments comes in contact with the optical connector 511.

As illustrated in FIG. 18A, the cleaning-target optical connector 511 according to one or more embodiments of the present invention may include guide pins 531B for aligned connection of optical connectors. Hence, an adhesive body of the cleaning tool according to one or more embodiments of the present invention is to come into contact with a ferrule endface 531A from which the guide pins 531B protrude. In consideration of this, pin escape portions 635 are formed in an adhesive member 633 of the cleaning tool 610 so as to make room for the guide pins 531B at the time when the guide pins 531B come in contact with the adhesive member 633 (see FIG. 18B). Accordingly, it is possible to suppress such a region from being created where the adhesive member 633 is not brought into contact with the ferrule endface 531A by being pulled by the tips of the guide pins 531B, thereby being able to bring the adhesive member 633 into sufficient contact therewith (see FIG. 18C). Note that the adhesive member 633 may be provided in a region where the guide pins 531B come into contact with the adhesive member 633 without providing the pin escape portions 635. In this case, the adhesive member 633 may have flexibility sufficient so as not to be pulled by the tips of the guide pins 531B when the guide pins 531B stick into the adhesive member 633.

Others

The foregoing embodiments are for facilitating the understanding of the present invention, and are not to be construed as limiting the present invention. The present invention may be modified and/or improved without departing from the scope thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

11: Optical connector; 12: Ferrule; 12A: Ferrule endface; 13: Optical fiber;
14: Ferrule pin; 16: Optical connector; 17: Ferrule; 17A: Ferrule endface;
18: Optical fiber; 20: Backplane optical connector;

21: Backplane housing; 22: Backplane housing hole; 22A to 22D: Backplane housing hole; 23: Backplane;
30: Printed-board optical connector; 31: Printed-board housing;
32: Printed-board housing hole; 32A to 32D: Printed-board housing hole;
33: Printed board; 40: Cleaning tool; 41: Adhesive portion; 41A: Cleaning portion; 41B: Cleaning portion; 41C: Adhesive face;
42: Base portion;
42A: Frame part;
43: Leg portion; 44: Engaging portion; 44A: Engagement release piece; 45: Attachment;
46: Side wall part;
47: Eaves part; 48: Inner engagement piece; 49: Inner protrusion;
50: Backplane connector;
56: Cleaner housing; 56A: Printed-board fitting portion; 56B: Backplane fitting portion;
57: Cleaning unit holding portion; 60: Identifying portion; 61: Optical connector; 62: Protrusion;
63: Connector housing; 64: Ferrule; 65: Bridge; 71: Optical connector;
72: Connector housing; 73: Connector housing; 74: Ferrule;
81: Coupling spring; 91: Cleaning portion; 91A: Cleaning portion;
91B: Cleaning portion;
91C: Substrate; 92: Cleaner housing; 110: Cleaning tool;
111: Optical connector; 130: Cleaning tool; 131: Body part; 132: Flange part;
133: Adhesive member; 134: Protrusion; 135: Ferrule; 136: Ferrule body part;
136A: Ferrule endface; 140: Floating mechanism; 141: Coil spring;
146: Engaging member; 147: Arm part; 147A: Claw part; 148: Receiving portion;
150: Housing; 150A: Housing protrusion; 160: Inner housing;
161: Window part; 163: Engaging portion; 164: Groove part; 164A: Spring receiver;
170: Outer housing; 171: Engaging target portion; 210: Cleaning tool;
230: Cleaning tool; 231: Body part; 232: Flange part; 233: Adhesive member;
240: Floating mechanism; 241: Coil spring; 246: Engaging member;
250: Housing; 250A: Housing protrusion; 311: Optical connector;
332: Ferrule flange part; 340: Floating mechanism; 341: Coil spring;
346: Engaging member; 350: Optical connector housing; 350A: Housing protrusion;
410: Cleaning tool; 511: Optical connector; 530: Ferrule;
531: Ferrule body part; 531A: Ferrule endface; 531B: Guide pin;
610: Cleaning tool; 633: Adhesive member; 635: Pin escape portion.

The invention claimed is:

1. A cleaning tool for cleaning a plurality of optical connectors, the cleaning tool comprising:
   an adhesive portion that is integrally formed with the cleaning tool and that contacts a plurality of connecting end faces of the optical connectors collectively, wherein
   each of the plurality of optical connectors houses a ferrule in an optical connector housing such that the ferrule retreats into the optical connector housing,
   the cleaning tool further comprises:
      a cleaning tool housing and
      a cleaning portion, housed in the cleaning tool housing, that retreats into the cleaning tool housing, and
   the cleaning portion comprises a flange that is longer than a flange of the ferrule in a direction of attaching/detaching of the cleaning tool and the optical connector.

2. The cleaning tool according to claim 1, wherein
the plurality of optical connectors are inserted into and connected with one housing that is fitted with another housing,
the adhesive portion is disposed on the other housing, and
the adhesive portion contacts the connecting end faces collectively by fitting the one housing with the other housing.

3. The cleaning tool according to claim 2, wherein
the adhesive portion is disposed on an attachment that is detachably attachable to the other housing.

4. The cleaning tool according to claim 3, wherein
an engaging portion is disposed at an end portion of the attachment on an opposite side of the adhesive portion, and
the engaging portion engages the attachment with the other housing.

5. The cleaning tool according to claim 4, wherein
an engagement release piece is disposed at an end portion of the attachment on a same side as the adhesive portion, and
the engagement release piece releases engagement of the attachment with the other housing using the engaging portion.

6. The cleaning tool according to claim 1, wherein
a pair of ferrule pins is formed in each of the connecting end faces, and a thickness of the adhesive portion is greater than a length of the ferrule pins.

7. The cleaning tool according to claim 6, wherein
when the pair of ferrule pins contacts the adhesive portion, a portion between the pair of ferrule pins in the adhesive portion rises.

8. The cleaning tool according to claim 2, wherein
the adhesive portion is detachably attachable to the other housing.

9. The cleaning tool according to claim 8, wherein
a frame part is disposed around a portion in which the adhesive body is formed.

10. The cleaning tool according to claim 1, wherein
the plurality of optical connectors comprises a first optical connector and a second optical connector that connects with the first optical connector, and
the cleaning tool further comprises:
   a first fitting portion that is fitted with the first optical connector, and
   a cleaning portion comprising a first cleaning face that contacts a plurality of the connecting end faces of the second optical connector collectively.

11. The cleaning tool according to claim 10, further comprising:
a second cleaning face that contacts a plurality of the connecting end faces of the first optical connector collectively when the first optical connector is fitted with the first fitting portion.

12. The cleaning tool according to claim 10, further comprising:
a second fitting portion that is fitted with the second optical connector.

13. The cleaning tool according to claim 10, wherein the first optical connector is an optical connector disposed on a printed board side, the second optical connector is an optical connector disposed on a backplane side, and the cleaning tool is attached to the printed board by fitting the first fitting portion with the first optical connector.

14. The cleaning tool according to claim 1, further comprising:

a coil spring that enables the cleaning portion to retreat into the cleaning tool housing, wherein a recessed part that houses at least part of the coil spring is disposed in the flange of the cleaning portion.

15. The cleaning tool according to claim 14, wherein a protrusion protruding in the direction of attaching/detaching is disposed on the flange of the cleaning portion, and a length of the protrusion in the direction of attaching/detaching is equal to or greater than 1 mm.

16. A cleaning tool for cleaning a plurality of optical connectors, the cleaning tool comprising:

an adhesive portion that is integrally formed with the cleaning tool and that contacts a plurality of connecting end faces of the optical connectors collectively, wherein each of the plurality of optical connectors each houses a ferrule in an optical connector housing such that the ferrule retreats into the optical housing connector, the cleaning tool further comprises:

a cleaning tool housing, and a cleaning portion, housed in the cleaning tool housing, that retreats into the cleaning tool housing, and the cleaning portion comprises a flange that is greater in width than a flange of the ferrule.

17. The cleaning tool according to claim 16, wherein a gap between the flange of the cleaning portion and an inner wall of the optical connector housing is smaller than a gap between the flange of the ferrule and the inner wall of the optical connector housing.

18. The cleaning tool according to claim 1, wherein an adhesive member that contacts the ferrule is disposed at an end portion of the cleaning portion, and the adhesive member is replaceable.

\* \* \* \* \*